(12) United States Patent
Liu et al.

(10) Patent No.: US 6,548,149 B1
(45) Date of Patent: Apr. 15, 2003

(54) INK JET RECORDING MATERIAL AND PROCESS FOR PRODUCING SAME

(75) Inventors: Bo Liu, Chiba (JP); Masami Kubota, Chiba (JP); Hiroyuki Nemoto, Ichihara (JP); Shun-ichiro Mukoyoshi, Ichikawa (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 09/567,900

(22) Filed: May 10, 2000

Related U.S. Application Data

(63) Continuation-in-part of application No. 08/842,043, filed on Apr. 23, 1997, now abandoned.

(30) Foreign Application Priority Data

| Apr. 24, 1996 | (JP) | 8-102494 |
| Jun. 24, 1996 | (JP) | 8-162818 |
| Sep. 19, 1996 | (JP) | 8-248267 |
| Sep. 19, 1996 | (JP) | 8-248268 |

(51) Int. Cl.$^7$ ............................................. B41M 5/00
(52) U.S. Cl. ...................... 428/195; 156/235; 427/146; 427/152
(58) Field of Search ................ 428/195, 206, 428/304.4, 331, 522; 156/235; 427/146, 152

(56) References Cited

U.S. PATENT DOCUMENTS

| 4,460,637 A | 7/1984 | Miyamoto et al. |
| 4,892,591 A | 1/1990 | Ogawa et al. |
| 4,902,568 A | 2/1990 | Morohoshi |
| 5,472,757 A | 12/1995 | Ogawa et al. |
| 5,612,281 A | 3/1997 | Kobayashi et al. |

FOREIGN PATENT DOCUMENTS

| EP | 0 685 344 A2 | 12/1995 |
| EP | 0 791 474 A2 | 8/1997 |
| JP | 58-110287 | 6/1983 |
| JP | 62-111782 | 5/1987 |
| JP | 63-13776 | 1/1988 |
| JP | 63-104878 | 5/1988 |
| JP | 20276670 | 11/1990 |
| JP | 3-215080 | 9/1991 |
| JP | 3-256785 | 11/1991 |
| JP | 5-32037 | 2/1993 |
| JP | 6-199034 | 7/1994 |
| JP | 06-255235 | 9/1994 |
| JP | 07-081214 | 3/1995 |
| JP | 7-89220 | 4/1995 |
| JP | 07101142 A | 4/1995 |
| JP | 07117334 A | 5/1995 |
| JP | 07117335 A | 5/1995 |
| JP | 07-276789 | 10/1995 |
| JP | 08-164668 | 6/1996 |
| JP | 08-207433 | 8/1996 |
| JP | 09-086032 | 3/1997 |
| JP | 09-099662 | 4/1997 |

OTHER PUBLICATIONS

"Silica, Synthetic," Pigment Handbook, vol. 1—Properties and Economics, pp. 161–198.

Abstract of Japanese Patent Publ. No. 01141783; dated Jun. 2, 1989.

McGraw–Hill Dictionary of Scientific and Technical Terms, Fourth Edition, p. 69.

*Primary Examiner*—Bruce H. Hess
(74) *Attorney, Agent, or Firm*—Arent Fox Kintner Plotkin & Kahn PLLC

(57) ABSTRACT

An ink jet recording material having a high gloss and capable of recording thereon ink images having high color density and clarity, has an ink-receiving layer formed on a substrate and including a binder and secondary particle having an average size of 10 to 300 nm and including a plurality of primary particles of silica prepared by wet method and/or aluminosilicate agglomerated with each other without binder, and can be produced by forming the ink-receiving layer on a shaping base, bonding the substrate to the ink-receiving layer on the shaping base and separating the resultant laminate from the shaping base.

20 Claims, 1 Drawing Sheet

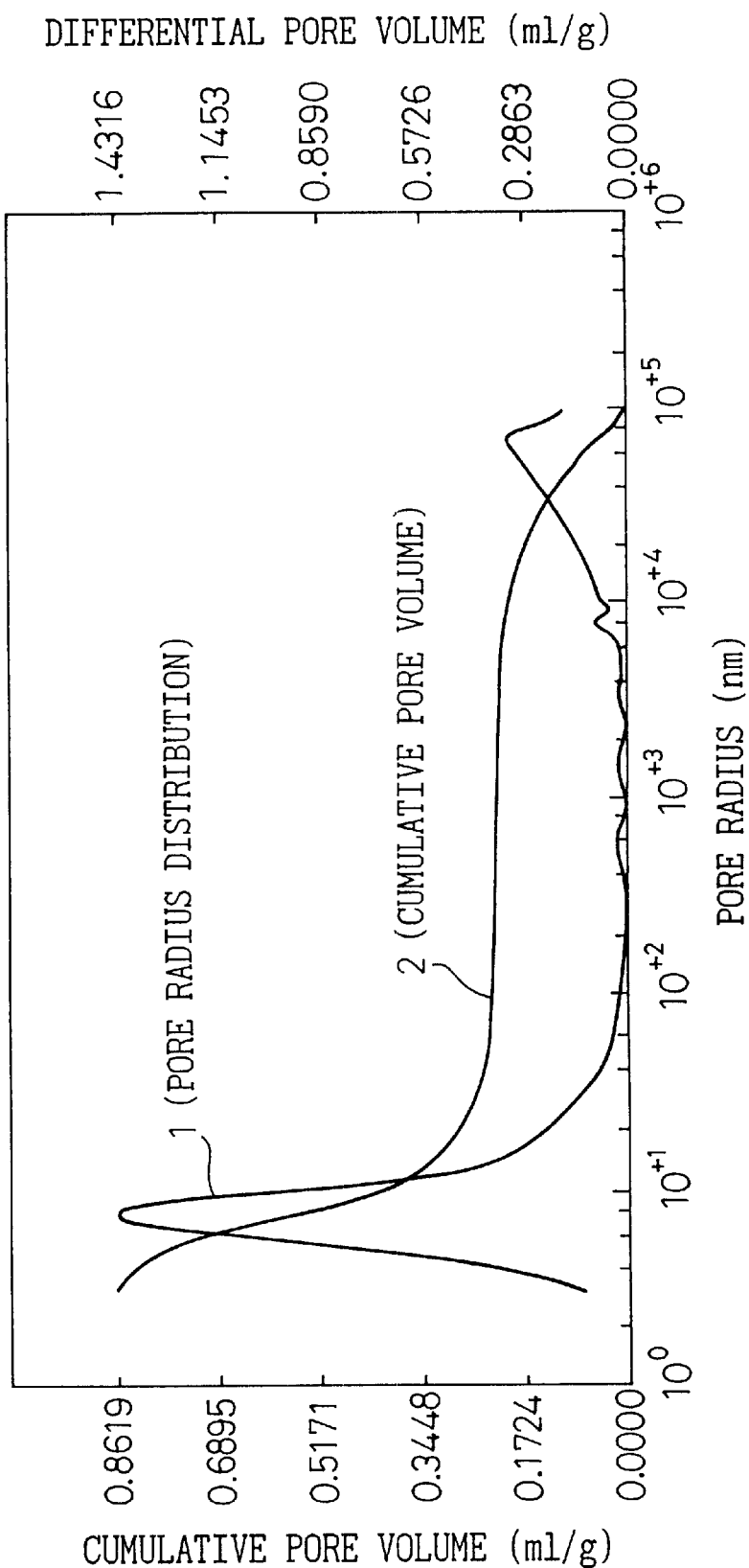

INK JET RECORDING MATERIAL AND PROCESS FOR PRODUCING SAME

This is a Continuation-in-Part application of U.S. Ser. No. 08/842,043 filed on Apr. 23, 1997, now abandoned.

BACKGROUND OF THE INVENTION

1. Field of the Invention

The present invention relates to an ink jet recording material and a process for producing the same. More particularly, the present invention relates to an ink jet recording material having excellent gloss, ink-receiving property, water-resistance, weather resistance and being capable of recording ink images with excellent color density and brightness and clarity, and a process for producing the same.

2. Description of the Related Art

The ink jet recording system is an ink image recording system wherein ink droplets are jetted through an ink-jetting nozzle toward a recording material and jetted ink droplets are absorbed in and fixed on the recording material, to form ink images. This ink jet recording system is advantageous in that full colored images can be easily formed and the printing noise is low.

The ink usable for the ink jet recording system contains a large amount of a solvent in which a coloring material is dissolved or dispersed and thus, to obtain a high color density of the recorded ink images, a large amount of the ink must be absorbed in the recording material. In the complete absorption of the ink droplets reached the recording material, a certain length of time is necessary. This feature of the ink jet recording system causes such a disadvantage that when the ink droplets are continuously jetted imagewise to form ink dots on the recording material surface, sometimes the ink droplets reach a target dot before an ink dot adjacent to the target dot has been completely absorbed in the recording material, and the target ink dot is connected to the adjacent ink dot so that the resultant ink image becomes unclear.

Accordingly, if the recording material for the ink jet recording system is to have such an advantage that the ink dots formed thereon have high color density and brightness and a high clarity, the ink droplets must be rapidly absorbed therein and even if the ink dots are overlapped on each other, substantially no blotting of the ink may occur.

When a coated paper sheet is used as a substrate for the ink jet recording material, at least one ink-receiving layer comprising a porous pigment is formed on the coated paper sheet to control the color brightness and sharpness of the ink images from which the image quality is established and to enhance the color-reproducibility and image-reproductivity. For example, Japanese Unexamined Patent Publication No. 62-111,782, No. 63-13,776 and No. 63-104,878 disclose an ink jet recording sheet having an ink-receiving layer containing primary or secondary pigment particles (usually, silica or alumina particles) having fine pores, and a binder. Also, Japanese Examined Patent Publication No. 63-22,977 discloses an ink jet recording sheet which has an ink-receiving layer including an uppermost layer provided with pores having a peak size of from 0.2 to 10 $\mu$m, and is capable of receiving an absorbed ink in voids having a size of 0.05 $\mu$m or less, and of forming ink images with a high quality.

Currently, due to the rapid spread of ink jet printers, various ink jet prints with a high gloss similar to that of photographic prints are demanded for publications and packing paper sheets. Particularly, in colored prints, film type or coated sheet type ink jet recording sheets which have high ink-absorbing and fixing rates and a high ink absorption are in great demand. To provide the above-mentioned ink-receiving layer having an increased porosity, it is necessary to use pigment particles having an increased particle size in the $\mu$m order or to utilize secondary particles of pigment. When the size of the pigment particles is increased, the resultant ink-receiving layer exhibits a decreased smoothness and a reduced light transmission. Namely, the resultant ink-receiving layer is opaque and has a poor gloss.

Various types of ink jet recording sheets having an ink-receiving layer containing a resin capable of dissolving therein the ink and of swelling by the ink are practically used. These types of ink jet recording sheets have an enhanced gloss. However, they are disadvantageous in that the resultant ink-receiving layer exhibits a low ink-drying rate and unsatisfactory resistance to moisture and water.

To enhance the smoothness and gloss of the ink-receiving layer, it has been attempted to form the ink-receiving layer in a two or more layered structure wherein an uppermost layer has a high gloss. This type of ink jet recording sheet is disclosed in, for example, Japanese Unexamined Patent Publications No. 3-215,080, No. 3-256,785, No. 7-89,220, 7-101,142 and 7-117,335. In this type of ink jet recording sheet, colloidal particles or a complex of colloidal particles are commonly used as a principal component of the high gloss layer. This type of high gloss layer is formed from the colloidal particles or complex thereof dispersed in a binder comprising a polymer latex, to establish a satisfactory transparency and ink-absorption. When the polymer latex is used as a binder, a plurality of small cracks are formed in the resultant coating layer. The small cracks are contributory to enhancing the ink-absorption of the ink-receiving layer. However, the small cracks cause the resultant ink dots formed on the cracked ink-receiving layer to have jagged circumferences significantly different from round circumferences, and thus the resultant ink images to exhibit reduced clarity and sharpness. Also, the small cracks cause the printed ink to spread on the ink-receiving layer and thus the ink dots to be enlarged. When the ink dots are formed in a usual density of the level of 360 dots per inch×360 dots per inch (dpi), the spread of the ink dots due to the small cracks of the ink-receiving layer does not cause any problems. However, if the ink dots are formed in a high density of the level of 720 dots per inch×720 dots per inch or more, the spread of the ink causes the spread ink dots to be connected to each other and thus the resultant ink images exhibits significantly reduced clarity and sharpness. Also, the colloidal particles in the uppermost high-gloss layer are primary particles and thus have substantially no fine pores capable of receiving the ink therein. Therefore, the ink is absorbed in the ink-fixing layer formed under the uppermost high-gloss layer. In the above-mentioned multi-layered ink-receiving layer, an ink-fixing layer is formed under the high gloss layer, and the thickness of the ink-fixing layer is larger than that of the high gloss layer. Also, the ink-fixing layer contains secondary particles of a pigment having a particle size in a $\mu$m order, the resultant multi-layered ink-receiving layer exhibits a significantly reduced transparency and thus the ink images fixed in the ink-receiving layer exhibit an unsatisfactory color density. Especially, this type of ink-receiving layer exhibits a reduced light reflection and thus an insufficient gloss.

To prevent the formation of the small cracks in the ink-receiving layer, Japanese Unexamined Patent Publication No. 7-117,334 provides an ink-receiving layer formed from a composition comprising pigment particles with a particle size of 0.1 μm or less and a polyvinyl alcohol with a degree of polymerization of 4,000 or more. The pigment particles are selected from primary pigment particles for example, colloidal silica or alumina sol. Therefore, in the resultant ink-receiving layer, the ink absorption and the transparency are unbalanced. Namely, since the pigment primary particles per se have no ink-absorption, the ink is absorbed in the gaps between the pigment primary particles. The gaps between the pigment primary particles in the ink-receiving layer are filled by a film-forming binder which is necessary to bond the pigment particles and to form an ink receiving layer. Therefore, the binder-filled gaps between the pigment particles exhibit a low ink absorption. To completely absorb a large amount of the ink, the ink-receiving layer must be formed in a large thickness. The ink-receiving layer with a large thickness easily forms small cracks. Also, to obtain an ink-receiving layer having a high transparency, the pigment primary particles must be selected from those having a small particle size.

The smaller the pigment primary particle size, the lower the ink-absorbing rate of the resultant ink-receiving layer. However, the larger the pigment primary particle size, the lower the transparency of the resultant ink-receiving layer, and the lower the color density of the printed ink images.

Japanese Unexamined Patent Publication No. 2-276,670 discloses an ink-receiving layer for an ink jet recording material. The ink-receiving layer is formed from a mixture of pseudoboehmite and a binder and has a plurality of pores having a radius of 40 to 100 angstrom (4 to 10 nm) and a total volume of 0.1 to 0.4 ml/g. The pseudoboehmite particles affect the hue of a certain type of inks which are affected by alumina. Accordingly, the pseudoboehmite-containing ink-receiving layer is unsuitable for the above-mentioned inks, for example, Acid Red 52 (food red dye No. 106). Also, the pseudoboehmite has a disadvantage in that it per se is yellowed with a lapse of time. Further, the pseudoboehmite is expensive and thus is difficult to use in practice. Furthermore, the pseudoboehmite particles are colloidal primary particles having a poor ink absorption and thus the resultant ink-receiving layer has an insufficient total pore volume and exhibits an unsatisfactory ink-absorbing rate and ink-absorption capacity.

Japanese Unexamined Patent Publications No. 5-32,037 and No. 6-199,034 disclose an ink jet recording material having an ink-receiving layer which contains agglomerated secondary particles of pseudoboehmite with a particle size of 100 to 500 nm and is provided with pores having a radius controlled to 30 to 100 angstrom (3 to 10 nm). However, this ink-receiving layer contains the pseudoboehmite particles and thus can not be released from the disadvantages derived from the pseudoboehmite particles. Namely, although the agglomerated secondary particles of pseudoboehmite are contributory to enhance the ink absorption of the resultant ink-receiving layer to a certain extent, the total pore volume of the ink-receiving layer containing the agglomerated secondary particles of pseudoboehmite is not sufficiently large and thus when the ink dots are formed in a high density of 720 dip×720 dpi or more, the ink-receiving layer does not completely absorb the ink at a satisfactory ink-absorbing rate.

Japanese Unexamined Patent Publication No. 7-117,335 discloses an ink jet recording material having an ink-receiving layer having high smoothness and gloss. This ink-receiving layer is formed in a multi-layered structure and has an uppermost gloss layer comprising, as a principal component, colloidal particles or composite colloidal particles, and laminated on an ink-fixing layer. The uppermost gloss layer is formed by pressing the uppermost layer in a wetted condition against a mirror-finished perperal surface of a shaping roll. However, the uppermost layer laminated on the ink-fixing layer easily sinks into the ink-fixing layer upon pressing and thus is difficult to sufficiently smooth by the mirror surface-transfer method. Accordingly, to enhance the mirror surface-transfer effect onto the uppermost layer, a polymer latex is used as a binder for the formation of the uppermost gloss layer. The use of the polymer latex causes the resultant uppermost gloss layer to be easily and finely cracked. The fine cracks contribute to enhancing the ink absorption rate in the uppermost gloss layer. However, the fine cracks also cause the resultant uppermost gloss layer to exhibit a reduced gloss and the ink dots formed on the uppermost gloss layer to have jagged circumferences and to be easily connected to each other. These features of the ink dots result in reduced clarity and sharpness of the printed ink images.

Further, in the above-mentioned ink jet recording material, since the uppermost layer of the ink-receiving layer is smoothed by a mirror-finished surface, and then dried, the substrate must be an air-permeable sheet, for example, a paper sheet. A non-permeable, high smoothness sheet, for example, a plastic film or a laminate, cannot be used as the substrate. When a paper sheet having a rough surface is used as a substrate, the resultant ink-receiving layer has a rough surface derived from the paper sheet surface. Also, when the recording sheet is dried water vapor permeates through the ink-receiving layer and forms pinholes in the ink-receiving layer. Therefore, the ink-receiving layer having a high gloss similar to that of photographic printing sheets is difficult to obtain.

To solve the above-mentioned problems, the inventors of the present invention have provided an ink jet recording material produced by forming an ink-receiving layer on a surface of a shaping base; bonding a substrate to the ink-receiving layer formed on the shaping base through an intermediate layer comprising a bonding material or an adhesive material; and separating the resultant laminate from the shaping base. In this type of ink jet recording material, a water-soluble resin can be used as a binder of the ink-receiving layer, the resultant ink dots on the ink-receiving layer is in the form of a true circle and the ink-receiving layer exhibits a high smoothness, a high ink absorption and a high gloss.

However, where the ink-receiving layer is formed in two or more-layered structure on the shaping base surface, a first layer (corresponding to an porous uppermost layer of the resultant ink jet recording is formed on the sheet) shaping base surface and then second, third and other layers are successively formed on the porous uppermost layer. In this case, pores or voids may be formed in the surface portions of the second, third or other layers, and may be retained even after the resultant multi-layered ink-receiving layer is transferred from the shaping base to the substrate surface. Also, when the coating liquids for the second, third and other layers are successively coated on the uppermost layer, the binder contained in those layers may diffuse into the first layer (porous uppermost layer) so as to change the ink-absorbing property of the first layer (porous uppermost layer). Further, as the amounts of the second, third and other layers are increased, the resultant multi-layered ink-receiving layer may exhibit a poor resistance to crack-formation.

U.S. Pat. No. 5,612,281 for Kobayashi et al discloses a recording sheet for ink jet recording having a transparent support and transparent colorant-receptive layer having a three dimensional network structure formed from silicic anhydride particles and a water-soluble resin. The coating solution for the colorant-receptive layer is prepared by, for example, by adding silica fine particles having an average primary particle size (diameter) of not more than 10 nm to water, dispersing the fine silica particles by using a high speed rotary wet colloid mill, adding, to the resultant aqueous fine silica dispersion,.an aqueous polyvinyl alcohol solution and adjusting the pH of the resultant aqueous dispersion to 4.5, to obtain a homogeneous sol. The coating solution is coated on the transparent support and dried to provide the colorant-receptive layer. When the coating solution layer is dried on the transparent support and reaches a gelation concentration through the evaporation of water, a wet gel is formed and, as the drying further progresses, a porous xerogel is formed to obtain a colorant receptive layer. In the resultant colorant receptive layer, the fine silica anhydride particles having a primary particle size of not more than 10 nm are adhered to each other through the polyvinyl alcohol binder to form a network structure, but not secondary particles each consisting of a plurality of primary particles agglomerated with each other, of the fine silica particles. Thus, the colorant receptive layer has a relatively high density and exhibits a poor ink absorbing property. The silica really disclosed in the U.S. patent is only dry method silica (dry process silica). The dry method silica causes the resultant ink-receiving layer to exhibit an ink absorbing property lower than that of the wet method silica (wet process silica).

SUMMARY OF THE INVENTION

An object of the present invention is to provide an ink jet recording material having a high gloss, a high resistance to weathering and a high resistance to water and capable of recording ink images having excellent clarity, and sharpness and satisfactory color density, brightness and brilliancy.

The above-mentioned object can be attained by the ink jet recording material of the present invention which comprises:

a substrate; and an ink-receiving layer formed on at least one surface of the substrate, wherein said ink-receiving layer comprises a binder, and a plurality of secondary particles, wherein said secondary particles have an average secondary particle size of 10 to 300 nm, each of said secondary particles consisting essentially of a plurality of primary particles of at least one member selected from the group consisting of silica prepared by wet method, which silica will be referred to as wet method silica hereinafter, and aluminosilicate, and wherein said primary particles are agglomerated with each other to form said secondary particles without any binder, in each of the secondary particles, pores being formed between the agglomerated primary particles.

In an embodiment of the ink jet recording material of the present invention, the ink-receiving layer has a haze value of 4 to 65%.

In another embodiment of the ink jet recording material of the present invention, the ink-receiving layer has a plurality of pores formed therein and exhibits a pore radius distribution curve having a peak-corresponding to a pore radius of about 40 nm or less.

The process of the present invention for producing the ink jet recording material comprises the steps of:

forming an ink-receiving layer comprising a binder, and a plurality of secondary particles, having an average secondary particle size of 500 nm or less and each comprising a plurality of primary particles of at least one member selected from the group consisting of silica and aluminosilicate, and agglomerated with each other to form the secondary particles, on a surface of a shaping base;

bonding the substrate to the ink-receiving layer provided on the shaping base to form a laminate; and separating the resultant laminate from the shaping base.

BRIEF DESCRIPTION OF THE DRAWING

FIG. 1 is a graph showing a pore radius distribution curve and a cumulative pore volume curve of all the pores, of the ink-receiving layer of the ink jet recording sheet of Example 14 in accordance with the present invention.

DESCRIPTION OF THE PREFERRED EMBODIMENTS

In the ink jet recording material of the present invention, an ink-receiving layer is laminated on at least one surface of a substrate. The ink-receiving layer comprises a binder matrix and a plurality of specific pigment particles dispersed in the binder matrix. The specific pigment particles for the present invention are secondary particles each comprising a plurality of primary particles of at least one member selected from the group consisting of silica and aluminosilicate, and agglomerated with each other to form the secondary particles having an average secondary particle size of 10 to 300 nm.

A conventional silica pigment is in the form of a powder consisting of a plurality of particles having a particle size of several $\mu$m, and thus exhibits a high ink absorption. However, this type of conventional silica pigment causes a resultant coating layer to exhibit a reduced transparency or to be opaque, and thus is unsuitable as a pigment for an ink-receiving layer of an ink jet recording material which is required to be capable of recording ink images having an enhanced color density and a high gloss. Also, the conventional silica pigment particles have a large particle size and thus the resultant ink-receiving layer has a rough touch and is difficult to fully smooth.

The inventors of the present invention have studied to solve the above-mentioned problems of the conventional silica pigment and found that the above-mentioned problems can be solved by using, as a pigment, secondary agglomeration particles comprising a plurality of primary particles of at least one member selected from silica and aluminosilicate, and agglomerated with each other to form the secondary particles which have an average secondary particle size controlled to 10 to 300 nm, and is in the form of colloid particles, and as a preferable binder, a water-soluble resin. The resultant ink-receiving layer is a porous layer having a satisfactory transparency and gloss and an enhanced ink-absorption. The silica is preferably an amorphous silica.

In the ink jet recording material of the present invention, since the specific colloidal particles of silica and/or aluminosilicate pigment are utilized, the resultant ink-receiving layer has an enhanced gloss and weathering resistance and capable of recording ink images with enhanced quality, in comparison with the conventional ink jet recording materials in which a conventional alumina or boehmite pigment is employed.

In the present invention, the pigment particles must be secondary particles each comprising an agglomeration of a plurality of primary particles of silica and/or aluminosilicate. Also, the secondary particles have an average particle size of 10 to 300 nm and are in the form of colloidal particles. If the conventional colloidal primary particles of silica and/or aluminosilicate are directly dispersed in the binder matrix, the resultant ink-receiving layer has a relatively dense structure and exhibits a decreased transparency and a reduced ink absorption. Therefore, to increase the ink-absorption, the ink-receiving layer must be formed in an increased thickness. The thick ink-receiving layer exhibits a low resistance to cracking. Also, the thick ink-receiving layer can be formed by complicated coating procedures. The silica and/or aluminosilicate secondary particles may contain non-agglomerated primary particles thereof in a small amount, for example, not exceeding 40% by weight.

The colloidal secondary particles of silica and/or aluminosilicate usable for the present invention have a poor self-bonding activity. Therefore, in the formation of the ink-receiving layer, a binder for the colloidal secondary particles must be used.

In the ink jet recording material of the present invention, when a combination of the colloidal secondary particles with a binder preferably comprising a water-soluble resin, for example, a polyvinyl alcohol is used as a principal component, an ink-receiving layer having a satisfactory transparency and a high gloss similar to that of the photographic paper sheet can be obtained. Also, since the ink-receiving layer is substantially transparent, the ink jet recording material of the present invention can be used for OHP.

Further, in the production of the ink jet recording sheet of the present invention, when the ink-receiving layer is formed on a smooth surface of a shaping base, and transferred and bonded to a substrate and then the resultant laminate is separated from the shaping base, the resultant ink-receiving layer has high smoothness and gloss.

The ink-receiving layer may be bonded to the substrate directly or through a bonding or adhesive material layer.

The conventional colloidal silica pigment is a dispersion of a plurality of primary particles, and has a lower ink recording density and ink absorption capacity than those of the specific secondary particles of silica usable for the present invention.

The substrate usable for the present invention comprises a member selected from, for example, regenerated cellulose films (cellophane); plastic resin films, for example, polyethylene, polypropylene, soft polyvinyl chloride resin, hard polyvinyl chloride resin, and polyester films; paper sheets, for example, wood-free paper sheets, art paper sheets, coated paper sheets, cast-coated paper sheets, metallic foil-laminated paper sheets, kraft paper sheets, polyethylene film-laminated paper sheets, resin-impregnated paper sheets, metal-deposited paper sheets, and water-soluble paper sheets; metallic foils; and synthetic paper sheets.

To obtain an ink-receiving layer having an excellent gloss, the substrate is preferably formed from a water-impermeable plastic resin film or resin-laminated paper sheet. When the substrate is formed from a transparent plastic resin film, the resultant recording material is a transparent recording material and can be used for OHP.

As mentioned above, the pigment particles usable for the ink-receiving layer of the present invention are secondary particles formed from primary particles of a member selected from silica and aluminosilicate having a specific primary particle size of 3 to 40 nm and are agglomerated with each other. The secondary particles have a secondary particle size of 10 to 300 nm.

Generally, a colloidal solution contains a plurality of colloidal particles having a particle size of about 1,000 nm or less and uniformly dispersed in a dispersion medium, for example, an aqueous medium. Accordingly, the silica or aluminosilicate secondary particles usable for the present invention having a particle size of 10 to 300 nm are in the form of colloidal particles. The silica or aluminosilicate secondary particles can be prepared by any conventional colloid forming method. For example, the secondary particles can be prepared by applying a strong mechanical stress to conventional synthetic amorphous silica agglomerate particles having a particle size of, for example, 1 $\mu$m to 50 $\mu$m, by using mechanical dividing means. Usually, the conventional synthetic amorphous silica agglomerate particles available in trade have a particle size of about 2 to 15 $\mu$m. This preparation method is referred to as a breaking down method wherein the synthetic amorphous silica particles are finely divided, while allowing the resultant primary particles to be agglomerated into secondary particles having an average secondary particle size of 10 to 300 nm.

The conventional synthetic amorphous silica agglomerate particles having a large particle size of 1 $\mu$m to 50 $\mu$m and usable for a breaking down procedure can be produced by a wet method (wet process).

The typical method of producing silica particles will be illustrated below.

The methods of producing the amorphous silica are classified into wet methods (wet processes) and dry methods (dry processes). The wet method silica is produced by using, as a starting material, siliceous sand, mainly silicon dioxide, which exists in large amounts around the globe. The physical properties of the amorphous silica can be controlled by the production method. Namely, various types of amorphous silica having a specific property necessary to desired use, for example, absorptive separations, catalyst carriers, and fillers for paints and resins, can be produced. The wet production methods of the amorphous silica include gelatinization methods and precipitation methods.

In the gelation method, the amorphous silica is produced by mixing sodium silicate produced from a high purity siliceous sand with sulfuric acid to provide a silicic acid sol, gradually polymerizing the silicic acid sol so as to form primary particles and then three-dimensionally to agglomerate the primary particles with each other into an agglomerate (secondary particles), namely to gelatinize the sol. By the above-mentioned method, the agglomerated particles of silica can be prepared while using no binder. In the method, the amorphous silica particles having desired BET specific surface area in the range of from 250 to 1500 $m^2/g$ can be produced by controlling the conditions for forming the primary particles. The resultant amorphous silica is finely divided to a micrometer size.

In the precipitation methods, the amorphous silica is produced under the same conditions as in the gelation method, except that the growth of the agglomerate (secondary) particles is stopped by influence of reaction temperature, co-existing ions or surfactant, and the resultant agglomerate particles are allowed to precipitate. This type of amorphous silica particles have a small BET specific surface area. Namely, the precipitated amorphous silica particle having a BET specific surface area of 25 to 400 $m^2/g$ can be used for the present invention.

In the dry methods (or dry process), the amorphous silica is produced by burning and hydrolysing $SiCl_4$ in gas phase. Therefore, this method is referred to as dry method against the wet method. In this dry method, the resultant silica particles have no pores or inner gaps and no inner surface area and thus exhibit an ink absorbing property lower than that of the wet method silica particles.

The silica particles produced by the dry method have a very small particle size and form, in water, chained particles in which individual particles are bonded with each other through hydrogen bonds. These hydrogen bonds are weak and thus are easily broken down when shearing forces are applied thereto.

The differences in the performance of the resultant amorphous silica pigments between the amorphous silica pigment production methods are as follows.

The amorphous silica pigment particles produced by the gelation method include primary particles having a small particle size and a strong agglomerating power and thus the resultant secondary particles have a relatively dense structure.

In the amorphous silica pigment produced by the precipitation method, the primary particles have a large particle size, and a low agglomeration power, and thus the resultant secondary particles may have a relatively loose structure. The fine pores are gaps formed between the primary particles agglomerated with each other and thus the pore volume is a controllable parameter of the agglomerate particles.

The amorphous silica primary particles made by the gelatinization method form agglomerate (secondary) particles having a higher strength than those produced by the precipitation method. The strong agglomerate particles are expected to contribute to enhancing the strength of the coating layer.

In the ink jet recording material, the agglomerated amorphous silica particles produced by the wet method are preferably employed. These agglomerated amorphous silica particles can be pulverized by, for example, the breaking down method, into secondary particles having the desired secondary particle size.

In the wet method silica particles, a plurality of the primary particles are agglomerated with each other by attraction force between the primary particles to form a secondary particles the attraction between the primary particles is due to a force including hydrogen bonding force between silanol groups located on the surfaces of the primary particles and van der Waals force between the primary particles.

The aluminosilicate particles have an amorphous structure and can be produced by subjecting a mixture containing, as principal components, an aluminum alkoxide and a silicon alkoxide to an hydrolysis procedure, and are a complex product comprising alumina moieties and silica moieties which are closely combined with each other to such an extent that these moieties cannot be isolated from each other. Usually, in the aluminosilicate particles, the alumina moieties ($Al_2O_3$) and the silica moieties ($SiO_2$) are contained in a weight ratio of 1:4 to 4:1, preferably about 6:2. The aluminosilicate particles usable for the present invention may further contain an additional moiety, for example, titanium alkoxide, zinc alkoxide and calcium alkoxide, in an amount of 10% by weight or less, preferably 0.1 to 2% by weight. These additional-moiety-containing aluminosilicate particles can be produced by adding a corresponding metal alkoxide to the additional moiety to the aluminum alkoxide and silicon alkoxide.

The aluminosilicate particles are prepared in an alcoholic atmosphere, and the resultant particles are in the form of secondary particles having a particle size in the order of $\mu$m.

To reduce the aluminosilicate secondary particle size to 10 to 300 nm, the above-mentioned aluminosilicate secondary particles supplied from the preparation process are divided in a medium, for example, an aqueous medium, by a mechanical dividing means.

The mechanical dividing means for the silica and aluminosilicate particles can be selected from, for example, ultrasonic homogenizers, high speed rotation mills, roller mills, container-driving medium mills, medium agitating mills,. jet mills, mortar, grinders (in which a material to be ground is placed in a bowl-shaped container and knead-ground with a pestle-shaped rod), and sand grinders.

The average primary and secondary particle sizes of the silica and aluminosilicate particles can be determined by using an electron microscope (SEM or TEM). Namely, an electron microscopic photograph of the particles is taken at a magnification of 10,000 to 400,000, the sizes of the particles located in an area of 5 cm×5 cm in the photograph are measured and an average of the measured particle sizes (martin diameter) is calculated.

In the present invention, the average size of the secondary particles of the silica or aluminosilicate is controlled to 10 to 300 nm, preferably 10.to 200 nm, more preferably 10 to 150 nm, still more preferably 20 to 100 nm.

If the silica or aluminosilicate secondary particles having an average particle size of more than 300 nm are used, the resultant ink-receiving layer exhibits an unsatisfactory transparency, the resultant ink images exhibit an unsatisfactory color density and thus an expected ink jet recording material having a high gloss after printing cannot be obtained. Also, if the average secondary particle size is smaller than 10 nm, the resultant ink-receiving layer exhibits an unsatisfactory ink absorption and ink-adsorbing rate.

In the present invention, the average size of the primary particles of silica and aluminosilicate is preferably controlled to 3 to 40 nm, more preferably 3 to 30 nm, still more preferably 5 to 30 nm. If the primary particle size is less than 3 nm, the resultant particles may have extremely small gaps between the primary particles and thus exhibit a significantly low capacity for ink or ink solvent absorption. Also, if the average primary particle size is more than 40 nm, the resultant secondary agglomeration particles may have too large a size and the resultant ink-receiving layer may exhibit an unsatisfactory transparency. In the ink jet recording material of the present invention, the wet method silica exhibits a recording property-enhancing effect higher rather than that of aluminosilicate.

Since the silica and aluminosilicate particles have a poor film-forming property, they must be bonded by using a binder to form the ink-receiving layer. The binder comprises a water-soluble resin or an aqueous emulsion, a latex, or a dispersion of resin. The water-soluble resin is preferably selected from polyvinyl alcohol (PVA), water-soluble modified polyvinyl alcohols, for example, silanol-modified polyvinyl alcohols, and cation-modified polyvinyl alcohols, polyvinyl pyrrolidone casein, soybean protein, synthetic proteins, starch, and water-soluble cellulose derivatives, for example, carboxy-methylcellulose and methylcellulose.

The binder may be an aqueous emulsion, latex or dispersion of a water-insoluble conjugated diene polymer selected from, for example, styrene-butadiene copolymers, and methyl methacrylate-butadiene copolymers. However, a water soluble resin is preferably used as a binder because the resultant ink receiving layer exhibits a high ink absorption.

From the view point of dispersibility and coating liquid stability, the polyvinyl alcohol is most preferable for the binder. Especially, the water-soluble resin contributory to enhancing the- ink absorption of the ink-receiving layer is selected from polyvinyl alcohol having a degree of polymerization of 2,000 or more, more preferably 2,000 to 5,000. To form an ink-receiving layer having an enhanced water resistance, the polyvinyl alcohol is preferably selected from those having a degree of saponification of 95% or more, more preferably, 97% to 100%.

In the ink-receiving layer of the present invention, there is no limitation to the solid weight ratio of the binder to the silica and/or aluminosilicate pigment particles. Preferably, the binder/pigment ratio is 10:1 to 10:10, more preferably 10:2 to 10:6. If the content of the binder is too high, the resultant ink-receiving layer has a small total volume of pores and thus exhibits an unsatisfactory ink absorption. Also, if the content of the binder is too small, the resultant ink-receiving layer has an unsatisfactory resistance to cracking and too low a mechanical strength.

The ink-receiving layer of the present invention optionally contains, in addition to the specific silica and/or aluminosilicate particles and the binder, an additional pigment selected from conventional inorganic and organic pigments for example, colloidal silica in the form of primary particles, kaolin, clay, calcined clay, zinc oxide, tin oxide, magnesium sulfate, aluminum oxide, aluminum hydroxide, calcium carbonate, satin white, aluminum silicate, smectites, zeolites, magnesium silicate, magnesium carbonate, magnesium oxide, diatomaceous earth, thermoplastic resin pigments, for example, styrene polymer pigments and thermosetting resin pigments, for example, urea-formaldehyde resin and benzoguanamine resin pigments. However, to maintain the smoothness and ink absorption of the ink-receiving layer at a satisfactory level, the content of the additional pigment is preferably restricted to a level of not exceeding 20% by weight based on the weight of the specific silica and/or aluminosilicate particles. Also, for the purpose of enabling the ink-receiving layer to exhibit a satisfactory transparency, the particle size of the additional pigment is preferably 2 $\mu$m or less.

In the ink-receiving layer of the present invention, a cationic resin is optionally further contained to enhance the ink-fixing property of the ink-receiving layer. The cationic resin usable for the purpose is preferably selected from polyalkylenepolyamine resins, for example, polyethylenepolyamine and polypropylenepolyamine resins and modified polyalkylenepolyamine resins, modified polyacrylic resins with a tertiary amine group or quaternary ammonium group, and diacrylamine resins. Usually, the cationic resin is contained preferably in an amount of 1 to 30 parts by weight, more preferably 5 to 20 parts by weight, per 100 parts of the total weight of the pigment component. Also, the ink-receiving layer optionally contains an additive selected from conventional dispersing agents, thickening agent, antifoaming agents, coloring materials, antistatic agents and antiseptic agents.

There is no specific limitation to the amount of the ink receiving layer.

The ink-receiving layer of the present invention is provided preferably in a coating amount of 1 to 100 g/m$^2$, more preferably 5 to 60 g/m$^2$. If the coating amount of the ink-receiving layer is too small, the increasing layer is difficult to form with a satisfactory uniformity. Also, if the coating amount is more than 100 g/m$^2$, the performance and effect of the resultant ink-receiving layer are saturated and sometimes the ink-receiving layer exhibits a reduced resistance to cracking. A thick ink-receiving layer having a weight of 15 g/m$^2$ or more can be obtained by increasing the viscosity of the coating liquid and/or the total concentration of the solid contents in the coating liquid for the ink-receiving layer, or by repeatedly coating the coating liquid two times or more.

In a preferred embodiment of the ink jet recording material of the present invention, the image-receiving layer containing the specific silica and/or aluminosilicate secondary particle have a plurality of pores formed therein due to the specific secondary particles and exhibits a pore radius distribution curve in which a peak appears at a pore radius of 40 nm or less.

Namely, in this preferable embodiment of the present invention, an ink-receiving layer formed on a surface of a substrate comprises a binder matrix comprising a binder, preferably a water-soluble resin, and a plurality of secondary particles having an average secondary particle size of 10 to 300 nm, preferably 10 to 150 nm, dispersed in the binder matrix, and each comprising a plurality of primary particles of at least one member selected from silica and aluminosilicate, having an average primary particle size of 3 to 40 nm and agglomerated with each other to form the secondary particles, has a plurality of pores formed therein, and exhibits a pore radius distribution curve having a peak corresponding to a pore radius of about 40 nm or less.

The above-mentioned secondary particles preferably have a total pore volume of 0.1 ml/g or more, more preferably 0.5 ml/g or more.

When the ink-receiving layer is formed by coating a surface of the substrate with a coating liquid containing the specific silica and aluminosilicate secondary particles, sometimes a small number of air bubbles are included in the resultant ink-receiving layer. Also, due to a scattering of the measurement data of the pore radius in a pore radius tester, the resultant pore radius distribution curve sometimes has a peak corresponding to a pore radius of more than 40 nm. However, this peak is smaller than the peak appearing at a pore radius of 40 nm or less. Also, in the pore radius distribution curve of the image-receiving layer, a region corresponding to a pore radius of 6 $\mu$m or more may have a small peak.

However, in the pore radius distribution curve of the ink-receiving layer of the present invention, the peak appears in the region corresponding to a pore radius of 40 nm or less and substantially no peak appears in the region corresponding to a pore radius of more than 40 nm but not more than 6 $\mu$m. Usually, there is no lower limit to the pore radius at which a peak appears in the pore radius distribution curve. The peak may appear at a very small pore radius of about 1 nm.

The total volume of the pores having a pore radius of 40 nm or less corresponds preferably to 40% or more, more preferably 65% or more, of the total volume of all the pores. In the present invention, the above-mentioned peak appearing in the pore radius distribution curve has a height corresponding to about 10% or more of the height of the highest peak appearing in the pore radius distribution. Smaller peaks sometimes appear due to the scattering of the measurement data and thus are usually neglected.

When the pores included in the ink-receiving layer have the above-defined pore radius distribution curve, the resultant porous ink-receiving layer has a high gloss, and satisfactory transparency, ink-absorbing rate and ink-absorption capacity, and can receive true circle-shaped ink dots. Also, in the present invention, the recorded ink images recorded in the ink-receiving layer has a high color density and brightness, and the resultant ink-receiving layer has an enhanced weathering resistance and a high ink-absorbing rate.

The silica or aluminosilicate particles for the present invention must be colloidal particles consisting essentially of secondary particles each composed of a plurality of primary particles agglomerated with each other. When the ink is absorbed in the pores formed between the secondary particles and having a relatively large pore size-, the ink is further absorbed in the fine pores formed between the primary particles in the secondary particles and having a relatively small pore size, and thus the ink receiving layer exhibiting enhanced ink absorbing rate, and ink absorption capacity can be obtained.

When colloidal particles consisting of primary particles simply dispersed, for example, colloidal silica particles from the trade, are used, the resultant ink receiving layer formed by coating a substrate with a coating composition containing the colloidal particles has a relatively high density, and the ink can be absorbed only in the pores formed between the primary particles. Therefore, to increase the ink absorbing rate and the ink absorption capacity, primary particles having a large particle size must be used. The increase in the particle size causes the transparency of the resultant ink receiving layer to be reduced. Also, to provide an link receiving layer having a high ink absorbing property, the ink receiving layer must be formed in a high coating amount. The high coating amount causes the resultant ink receiving layer to exhibit a reduced resistance to cracking and the coating procedure to be complicated.

The pigment particles used for the present invention may contain a small amount of primary particles not agglomerated with each other.

In the ink jet recording material of the present invention, preferably the ink receiving layer includes a plurality of pores formed therein, the total volume of all the pores is 0.6 ml/g or more, more preferably 1 ml/g or more, and the total volume of the pores with a pore size of 3 to 20 nm is 0.3 ml/g or more, preferably 0.4 ml/g or more. This preferable ink receiving layer has enhanced transparency, ink-absorbing rate and ink-absorption capacity and the recorded ink images have enhanced color density and gloss.

There is no upper limit to the total volume of all the pores in the ink-receiving layer. Usually, the total volume of all the pores can be increased up to about 2.5 ml/g. Also, there is no upper limit to the total volume of the pores with a pore size of 3 to 20 nm. Usually, the total volume of the pores may be 2.0 ml/g or more. Preferably the total volume of the pores with a pore size of 3 to 20 nm is 0.4 to 1.5 ml/g.

Since this type ink-receiving layer is entirely transparent, when a transparent substrate sheet is used, the resultant ink jet recording material can be used for OHP. The smoothness and gloss of the ink-receiving layer can be improved by forming a coating layer corresponding to the ink-receiving layer on a smooth surface of a shaping base, bonding a substrate to the coating layer, and then separating a resultant laminate from the shaping base.

The pore radius distribution of the ink-receiving layer can be determined by the following measurement. An ink-receiving layer is formed on a surface of a thermoplastic film, and then removed from the thermoplastic film by using a peeling tool, for example, a cutter knife. If the thermoplastic film has substantially no influence on the measurement of the pore radius distribution, the film may not be separated from the ink-receiving layer.

The measurement specimen is subjected to a cumulative pore volume measurement by a mercury-forcing method using a micrometrix poresizer 9320 (trademark, made by Shimazu Seisakusho). A pore radius distribution is calculated from the cumulative pore volume test result. The pore size is calculated from the following equation, on the assumption that the cross-sections of the pores are circle-shaped.

$$R = -2\gamma \cos \theta / P$$

wherein R represents a radius of pore, $\gamma$ represent a surface tension of mercury, $\theta$ represent a contact angle of mercury, and P represents a mercury-forcing pressure.

In the measurement, the surface tension of mercury is 482.536 dye/cm and the contact angle is 130 degrees, the mercury-forcing pressure is 0 to 30 psia in a low pressure region for a pore radius to be measured of 180 to 3 $\mu$m, and 0 to 30,000 psia in a high pressure region for a pore radius to be measured of 3 $\mu$m to 3 nm.

The cumulative pore volume of the ink-receiving layer specimen can be calculated from the weight of the specimen and the cumulative pore volume curve.

In another preferable embodiment of the ink jet recording material of the present invention, the ink-receiving layer contains the specific silica and/or aluminosilicate secondary particles having an average secondary particle size of 10 to 300 nm, preferably 10 to 200 nm and has a haze value of 4 to 65% preferably 4 to 55%, more preferably 4 to 35%, still more preferably 4 to 20%. This type of ink-receiving layer exhibits an enhanced ink-absorbing rate, ink-absorption capacity, gloss and transparency and the resultant ink dots recorded thereon are true-circle-shaped.

The haze value of the ink-receiving layer is measured by the following method.

An ink-receiving layer is coated on a transparent thermoplastic film having a thickness of 75 $\mu$m (trademark: Lumiler T, made by Toray Industries, Inc.), and subjected to a haze-value measurement using a haze meter (reflection and transmission tester, Model: HR-100, made by Murakami Shikisaigijutsu Kenkyusho). The measurement is carried out in -accordance with JIS K7105 as follows.

(1) A standard white plate is fixed to the tester and an amount of incident light is controlled so that an indicator of the tester indicates a value Ti of 100.

(2) A specimen is fixed together with the standard white plate, and a total amount $T_2$ of light transmitted through the specimen is measured.

(3) The standard white plate and specimen are removed, a light trap is fixed, and an amount $T_3$ of light scattered in the tester is measured.

(4) The specimen is attached together with the light trap to the tester, and an amount $T_4$ of scattered light by the tester and the specimen is measured.

(5) Then the haze value of the specimen is calculated in accordance with the following equations.

Total light transmission $Tt(\%) = (T_2/T_1) \times 100$

Defused light transmission $Td(\%) = \{[T_4 - T_3(T_2/T_1)]/T_1\} \times 100$ Haze value $H(\%) = (Td/Tt) \times 100$ If the haze value is less than 4%, although the resultant ink-receiving layer may exhibit an enhanced transparency, the ink-absorbing rate and ink-absorption capacity of the ink-receiving layer may be unsatisfactory. Also, if the haze value is more than 65%, the resultant ink-receiving layer may exhibit too low a transparency and the recorded ink images may have an unsatisfactory color density. The haze value is preferably 4 to 35%, more preferably 4 to 20%. The haze value of the ink-receiving layer is variable depending not only on the secondary particle size but also on the primary particle size of the silica and/or aluminosilicate colloidal particles. Preferred average secondary particle-size is 10 to 200 nm and the preferred average primary particle size is 3 to 40 nm. Also, the haze value of the ink-receiving layer is variable depending on the amount and refractive index of the binder. Namely, a gloss ink-receiving layer having a low haze value (a high transparency) can be obtained by using a binder having high transparency.

Also, even when the ink-receiving layer is formed in an amount of 10 g/m² or more, the color density and gloss of the printed ink images can be enhanced by adjusting the haze value of the ink-receiving layer to 4 to 65%, and the resultant ink jet recording material can record thereon high quantity ink images.

In still another preferable embodiment of the ink jet recording material of the present invention, the surface of the ink-receiving layer has a Bekk smoothness of 1,000 seconds to record thereon ink images with a high gloss.

The ink jet recording material of the present invention optionally further comprises at least one additional ink-absorbent layer comprising a binder resin and a plurality of pigment particles. The additional ink-absorbent layer is laminated preferably between the substrate and the ink-receiving layer. Namely, in this case, the ink-receiving layer forms an actual uppermost (or outermost) layer and the additional ink-absorbent layer forms an actual inside layer of the ink jet recording material of the present invention.

The additional ink-absorbent layer may be the same as or different from the ink-receiving layer in the composition thereof.

Where the additional ink-absorbent layer contains, as a pigment component, the same specific silica and/or aluminosilicate secondary particles as those of the ink-receiving layer, the resultant ink jet recording material has most satisfactory gloss and transparency and can record thereon ink images having most satisfactory color density, clarity and brightness.

Nevertheless, a combination of the ink-absorbing layer with at least one additional ink-absorbent layer containing a pigment different from the specific silica and/or aluminosilicate secondary particles can exhibit a satisfactory ink-absorbing rate, ink-absorption capacity, gloss, transparency, water-resistance and whethering resistance and can record thereon ink images with satisfactory color density, clarity and brightness.

To ensure the high gloss of the ink receiving layer after printing, the amount of the specific silica and/or aluminosilicate secondary particle-containing layer is preferably controlled to a level of 50 to 100% by weight based on the total weight of the ink-receiving layer and the additional ink-absorbent layer. Even if the amount of the silica and/or aluminosilicate secondary particle-containing layer is less than 50%, the resultant ink jet recording material can exhibit a certain gloss but cannot exhibit a high gloss and brightness similar to those of photographic paper sheets.

When the amount of the specific silica and/or aluminosilicate secondary particle-containing layer is 50 to 100% based on the total weight of the ink-receiving layer and the additional ink-absorbent layer, the resultant gloss and brightness are similar to those of the conventional photographic paper sheets.

As mentioned above, the additional ink-absorbent layer is preferably located between the substrate and the ink-receiving layer, and comprises a plurality of pigment particles which are conventionally used for the coated paper production and have an average particle size of 0.5 µm or more. The pigment for the additional ink-absorbent layer is preferably selected from synthetic amorphous silica, clay, alumina, or smectite particles. The synthetic amorphous silica pigment is most preferable for recording ink images having satisfactory color density, clarity and brightness.

The additional ink-absorbent layer may comprise the above-mentioned specific agglomerate particles of silica and/or aluminosilicate usable for the ink receiving layer.

In the additional ink-absorbent layer, the binder comprises, for example, a water-soluble resin, for example, polyvinyl alcohols, casein and starches as mentioned above, and a latex or aqueous emulsion or dispersion of a water-insoluble synthetic resin, for example, a styrene-butadiene copolymer later. Preferably the water-soluble resin is used.

The binder is contained preferably in an amount of 5 to 150 parts by weight, more preferably 10 to 50 parts by weight, per 100 parts by total weight of the pigment component. Also, the additional ink-absorbent layer optionally contains the cationic resin as mentioned above, to enhance the ink-fixing property thereof. The cationic resin is contained in an amount of preferably 1 to 30 parts by weight, more preferably 5 to 20 parts by weight, per 100 parts by total weight of the pigment component. Further, the additional ink-absorbent layer optionally contains an additive selected from dispersing agents, thickening agents, antifoaming agent, coloring materials, antistatic agents and antiseptic agents which are commonly used for the coated paper production, in a small amount, for example, 0.01 to 5 parts by weight per 100 parts by weight of the pigment component.

There is no limitation to the amount of the additional ink-absorbent layer. Usually, the amount of the additional ink-absorbent layer is preferably adjusted to 3 to 30 g/m². If the amount is too small, the resultant additional ink-absorbent layer has too low an ink-absorption capacity and thus is meaningless. Also, if the amount is too large, the effect of the additional ink-absorbent layer is saturated and sometimes results in an economical disadvantage.

Even when the ink-receiving layer is formed on the additional ink-absorbent layer, the ink receiving layer preferably has a haze value of 4 to 65%, more preferably 4 to 55%, still more preferably 4 to 35%, further preferably 4 to 20%. Also, the additional ink-absorbent layer may comprise the specific silica and/or aluminosilicate secondary particles. To enhance the color density of the printed ink images, preferably, the average secondary particle size of the specific silica and/or aluminosilicate secondary particles in the ink receiving layer is smaller than the particle size of the pigment component in the additional ink-absorbent layer.

The ink-receiving layer and the additional ink-absorbent layer can be formed on the substrate by using a conventional coating method and apparatus, for example, a die coater, a blade coater, air knife coater, roll coater, bar coater, gravure coater, rod blade coater, lip coater, curtain coater.

In still another preferable embodiment of the ink jet recording material of the present invention, the substrate is transparent. In this embodiment, the ink-receiving layer preferably comprises the specific silica and/or aluminosilicate secondary particles having a secondary particle size of 10 to 300 nm, preferably 10 to 200 nm, and preferably a primary particle size of 3 to 40 nm, and has a haze value of 4 to 65%, more preferably 4 to 55%, still more preferably 4 to 35%, further preferably 4 to 20%.

The transparent substrate can be formed from transparent polymeric sheets or films, for example, regenerated cellulose films (cellophane), and thermoplastic films such as polyethylene, polypropylene, soft polyvinyl chloride resin, hard polyvinyl chloride resin, polyester (polyethylene terephthalate, etc.) films. The transparent substrate preferably has a haze value of 20% or less.

Further preferably, the ink-receiving layer contains the specific silica and/or aluminosilicate colloidal particles having an average primary particle size of 3 to 30 nm and an average secondary particle size of 10 to 100 nm more preferably 20 to 80 nm, and has, as a whole, a haze value of 20% or less. The haze value of the ink jet recording material can be determined in accordance with the measurement method mentioned above.

The above-mentioned type of ink jet recording material of the present invention exhibits high transparency, ink-absorbing property, water resistance, whethering resistance, can record thereon ink images with high color density and clarity, and thus is useful as a transparent ink jet recording sheet for, for example, OHP. If the haze value is more than 20%, the resultant ink jet recording sheet is not suitable for OHP, because in this case, the projected images from the ink jet recording sheet onto OHP may be unclear.

There is no lower limit to the haze value. The haze value may be small, for example, 5% or less.

When an ink jet recording material having a haze value of 20% or less is designed, the primary and secondary particle sizes of the silica and/or aluminosilicate particles should be controlled to the specific values as defined-in the present invention. If the average primary and/or secondary particle size is too small, the resultant ink-receiving layer may exhibit an unsatisfactory ink-absorption property. In this case, to enhance the ink-absorption property, the thickness of the ink-receiving layer must be undesirably increased. The thick ink-receiving layer exhibits a reduced resistance to cracking.

In the ink jet recording material of the present invention the ink-receiving layer and optionally the additional ink-absorbent layer can be directly formed on a surface of the substrate by using a coating apparatus. Alternatively, in another process for producing the ink-jet recording material of the present invention, the ink receiving layer is formed on a surface, especially a smoothed surface, of a shaping base; a substrate is bounded to the ink-receiving layer on the shaping base; and then the resultant laminate is separated from the shaping base surface. The resultant ink-receiving layer surface has an enhanced smoothness and gloss. The ink receiving layer on the shaping base may be bonded to the substrate through an intermediate layer comprising a bonding material or an adhesive material. The intermediate layer may be formed on a surface of the substrate and then the substrate surface may be bonded to the ink-receiving layer on the shaping base surface through the intermediate layer. Otherwise, the intermediate layer may be formed on the ink-receiving layer on the shaping base and then the substrate is bonded to the intermediate layer.

The above-mentioned method using the smooth shaping base is especially advantageous in that the resultant ink-receiving layer containing the specific silica and/or aluminosilicate secondary particles can exhibit enhanced smoothness and gloss.

The bonding of the ink-receiving layer formed on the shaping base surface to the substrate is preferably carried out by a conventional laminating method, for example, dry laminating method, wet laminating method, hot melt laminating method or extrusion laminating method.

In the wet, dry and hot melt laminating methods, preferably, an intermediate layer comprising a bonding or adhesive material is formed on a surface of the substrate, and then the intermediate layer on the substrate is superposed on the ink-receiving layer formed on the shaping base, they are bonded under pressure, and then the resultant laminate is separated from the shaping base to obtain an ink jet recording material.

In the extrusion laminating method, a melt of a thermoplastic resin, for example, a polyethylene resin melted at a temperature of 280 to 320° C., is prepared in a melt-extruder and then extruded through a film-forming slit onto a surface of a substrate to form an intermediate layer; the ink receiving layer formed on the shaping base is superposed on the intermediate layer on the substrate; they are bonded to each other under pressure while cooling by a cooling roll, and then the resultant laminate is removed from the shaping base.

When a pressure-sensitive adhesive is used for the intermediate layer, a surface of the substrate is coated with the pressure-sensitive adhesive by a conventional coating method, for example, bar coater, roll coater or lip coater; the coated adhesive layer is dried; the dried adhesive layer is laminated on the ink-receiving layer formed on the shaping base; and then the resultant laminate is removed from the shaping base to obtain a ink jet recording material.

There is no specific limitation to the amount of the intermediate layer as long as the resultant intermediate layer can firmly bond the ink-receiving layer to the substrate therethrough. Usually, the intermediate layer formed from a thermoplastic resin, bonding material or pressure-sensitive adhesive is preferably in an amount of 2 to 50 g/m$^2$. If the amount of the intermediate layer is too small, the bonding strength of the substrate to the ink-receiving layer may be unsatisfactory. Also, the intermediate layer is formed in too large an amount, the bonding strength may be saturated and an economical disadvantage may occur.

The intermediate layer for bonding the ink-receiving layer to the substrate can be formed from a member selected from thermoplastic polymers, for example, ethyl cellulose, vinyl acetate polymer, copolymers and derivatives thereof, polyethylene, ethylene-vinyl acetate copolymers, polyvinyl alcohols, acrylic resins, polystyrene, styrene copolymers, polyisobutylene, hydrocarbon resins, polypropylene, polyamide resins, and polyester resins; bonding materials, for example, thermosetting resins such as urea resins, phenol resins, epoxy resins, and polyisocyanate resins, composite polymer-type bonding agents such as polyvinyl acetal/phenol resin, rubber/phenol resin, and epoxy resin/nylon resin, rubber-based bonding materials, for example, rubber latex-type bonding agents, and hydrophilic natural polymer bonding agents such as starch, glue and casein; and pressure-sensitive adhesives, for example, solvent type pressure-sensitive adhesives, emulsion type pressure-sensitive adhesives, hot melt-type pressure-sensitive adhesives and delayed type pressure-sensitive adhesives.

The shaping base is formed from a member selected from polymer films, for example, regenerated cellulose, polyethylene, polypropylene, soft polyvinyl chloride resin, hard polyvinyl chloride resin, and polyester films; surface-smoothed paper sheets, for example, glassine paper sheets, coated paper sheets, for example, polyethylene-laminated paper sheets, resin-impregnated paper sheets and metallized paper sheets; metal foils, for example, aluminum foil, and synthetic paper sheets; and plates of inorganic glasses, metals and plastics, which have a high smooth surface. Especially, polymer films, for example, polyethylene, polypropylene and polyester films, polyethylene-laminated paper sheets, glassine paper sheets and inorganic glass plates and metal plates are advantageously used for the shaping base, because they can be easily coated with a coating liquid for the ink-receiving layer and allow the resultant laminate to be easily separated from the shaping base.

To obtain a high gloss ink-receiving layer, the shaping base has a shaping surface with a high smoothness. The shaping surface preferably has a surface roughness Ra of 0.5 μm or less, more preferably, 0.05 μm or less, determined in accordance with Japanese Industrial Standard (JIS) B 0601.

The shaping base surface can be used without applying any surface treatment thereto. To enhance the release property of the resultant ink-receiving layer from the shaping base, the shaping surface is preferably coated with a releasing agent, for example, a silicone resin or fluorine-containing resin. Also, to enhance the affinity of the shaping base surface to the coating liquid for the ink-receiving layer, the shaping base surface may be hydrophillized by applying a corona-discharge treatment or a plasma treatment thereto.

Where an additional ink-absorbent layer is contained in the ink jet recording material, firstly the shaping base surface is coated with the ink-receiving layer and then with the additional ink-absorbent layer. Then the substrate is bonded to the additional ink absorbent layer formed on the ink-receiving layer, through an intermediate layer or without using the intermediate layer. In this case, at least the ink receiving layer, contains fine pigment particles having an average particle size of 50 nm or less, preferably pigment secondary particles having an average secondary particle size of 10 to 300 nm, still more preferably the above-mentioned silica or aluminosilicate secondary particles.

In an embodiment of the process of the present invention for producing the ink jet recording material, the ink-receiving layer formed on the shaping base is directly bonded to the substrate which may be coated with an additional ink-absorbent layer, without using the intermediate layer.

Generally, it has been realized that the dry ink-receiving layer cannot be directly bonded to the substrate when no adhesive intermediate layer is used. The inventors of the present invention attempted to firmly bond the dry ink-receiving layer to the substrate without using a bonding material and found that the dry ink-receiving layer formed on the shaping base surface can be firmly bonded to the substrate with a bonding strength (mainly derived from van Der Waals attraction therebetween) higher than the adhesive strength between the dry ink-receiving layer and the shaping base surface, by controlling the bonding temperature and the bonding pressure between the dry ink-receiving layer and the substrate superposed on the ink-receiving layer. In this case, the resultant laminate can be separated from the shaping base surface without separation between them, and the resultant ink jet recording material has high smoothness and high gloss and can record thereon ink images with a high color density and clarity.

The same firm bonding as mentioned above can be attained even when the substrate is bonded to an additional ink-absorbent layer formed on the shaping base. Similarly, the additional ink-absorbent layer bonded to the substrate can be firmly bonded to the ink-receiving layer formed on the shaping base. Also, two or more additional ink-absorbent layers successively formed on the shaping base can be successively bonded on the substrate in the above-mentioned way and finally, firmly bonded to the ink-receiving layer formed on the shaping base. In this case, each additional ink-receiving layer separated from the shaping base has a smooth surface and thus can be firmly bonded to an adjacent additional ink-absorbent layer or to the ink-receiving layer by the press-bonding procedure without using the bonding material, and resultant composite coating layer consisting of the additional ink-absorbent layer(s) and the ink-receiving layer exhibits an enhanced resistance to cracking.

In the process of the present invention for producing the ink jet recording material, the press bonding of the ink-receiving layer to the substrate or the additional ink-absorbent layer bonded to the substrate is preferably carried out after wetting at least one of the ink-receiving layer and the substrate or the additional ink-absorbent layer on the substrate with a small amount of water or water vapor. The water or water vapor is contributory to enhancing the bonding strength and/or the bonding- rate of the ink-receiving layer to the substrate or the additional ink-absorbent layer on the substrate.

In the process of the present invention for producing the ink jet recording material, the content of water or solvent in the ink-receiving layer or the additional ink-absorbent layer formed on the shaping base is preferably controlled to a level of 50% by weight or less, more preferably 20% by weight or less, still more preferably 10% by weight or less, based on the total dry weight of the layer. Compared with this process, if a conventional wet laminating method is applied, the substrate paper sheet may have a wavy or corrugated surface. Also, in the conventional wet laminating method, a wet resin layer laminated on the substrate must be dried, and thus the substrate must have a porous structure which will allow a vapor of water or solvent to permeate therethrough. The above-mentioned process of the present invention is substantially free from the above-mentioned disadvantageous of the wet lamination method.

In the process of the present invention for producing the ink jet recording material, the ink-receiving layer formed on the shaping base is directly press-bonded to the substrate or to the additional ink-absorbent layer. There is no specific limitation to the bonding pressure. Usually, the press-bonding is carried out preferably under a linear pressure of 1 to 250 kg/cm, more preferably 3 to 120 kg/cm. If the bonding pressure is too low, the resultant bonding strength between the ink-receiving layer and the substrate or the additional ink-absorbent layer may be unsatisfactory. Also, if the bonding pressure is too high, the ink-receiving layer and/or the substrate or the laminate of the additional ink-absorbent layer and the substrate may be crushed and the ink-absorption capacity of the ink receiving layer and/or the additional ink-absorbent layer may be significantly decreased.

The press-bonding apparatus is not limited to a specific apparatus. Usually, a super calendar is preferably utilized for the press-bonding. Also, the super calendar preferably has a pair of metal rollers which have a high resistance to damage, deformation, and wear and a high durability in practical use.

In the press-bonding procedure, the bonding temperature is not limited to a specific temperature. Usually, the press-bonding is carried out preferably at a temperature of 35 to 150° C., more preferably 50 to 100° C. The bonding heat is supplied from, for example, bonding rolls, to the objects to be bonded. If the bonding temperature is too low, the resultant bonding strength between the ink-receiving layer and the substrate or the additional ink-absorbent layer may be unsatisfactory. Also, if the bonding temperature is too high, the ink-receiving layer, the substrate and/or the additional ink-absorbent layer may be crushed or deformed. Practically, the press-bonding procedure is carried out under the above-mentioned pressure while heating.

When water or water vapor is supplied to the ink-receiving layer, the substrate or the additional ink-absorbent layer to be subjected to the press-bonding procedure, the amount of water to be contained in the above-mentioned layer or substrate is not limited to a specific amount. Usually, the amount of water is controlled preferably to 0.1 to 10 g/m$^2$, more preferably 2 to 8 g/m$^2$. If the water amount is too small, the bonding effect may not be satisfactorily promoted. If the water amount is too much, the bonding effect may be saturated.

When water or water vapor is absorbed by at least one of the above-mentioned layers and substrate, the close contact between the layers or substrate is promoted and thus the bonding strength is enhanced and the transfer of the ink-receiving layer from the shaping base to the substrate side can be easily effected. By applying water or water vapor, the necessary bonding temperature and/or pressure can be reduced. For applying water, a conventional coating device, for example, blade coater, air knife coater, roll coater, bar coater, gravuor coater, rod blade coater, lip coater or curtain coater can be utilized.

When water vapor is used, the ink-receiving layer and the additional ink-absorbent layer which have a plurality of pores for absorbing the ink, and a porous substrate, for example, paper sheet, can rapidly absorb the water vapor in the pores and wetted with water. The water vapor method can accurately and uniformly control the amount of water absorbed by the above-mentioned layers or substrate, so as to prevent the uneven shrinkage or elongation of the layers or substrate.

When water vapor is used, the amount of water absorbed by the ink-receiving layer, the substrate or the additional ink-absorbent layer is preferably controlled to 5 to 300%, more preferably 10 to 150%, still more preferably 20 to 100%, based on the absolute dry weight of the above-mentioned ink-receiving layer, substrate or additional ink-absorbent layer. If the water vapor is absorbed in too small an amount, the bonding-promotion effect of water vapor may be insufficient, and the ink-receiving layer may not be smoothly transferred. Also, if the absorbed amount of water vapor is too large, the ink-receiving layer or the additional ink-absorbent layer may be deformed (shrunk or elongated) during the press-bonding procedure, and the deformation may causes the resultant ink jet recording material to be curled after drying.

The water vapor can be supplied by utilizing a water vapor-spouting device (which is attached to a coating apparatus and used for controlling curling of the resultant ink jet recording material), an ultrasonic water vapor-generating device or other water vapor-generating device.

The ink applicable for the ink jet recording material of the present invention can be selected from conventional inks for the ink jet recording system.

The ink comprises, as indispensable components, a coloring material for forming visual images and a liquid medium for dissolving or dispersing the coloring material therein and, as optional components, a dispersing agent, surfactant, viscosity-regulating agent, specific resistance regulating agent, pH-regulating agent, mildewproofing agent, and solution or dispersion-stabilizer for the coloring material.

The coloring material for the ink for the present invention is not limited to specific materials. Usually, the coloring material is selected from direct dyes, acid dyes, basic dyes, reactive dyes, coloring matters for foods, disperse dyes, oil dyes and coloring pigments. The content of the coloring material is variable depending on the type of the coloring material, the type of the liquid medium and properties required to the ink. Usually, the coloring material is contained in a concentration of 0.1 to 20% by weight in the ink usable for the ink jet recording material of the present invention.

The liquid medium for the ink is usually selected from water and water-soluble organic solvents, for example, alkyl alcohols having 1 to 4 carbon atoms such as methyl alcohol, ethyl alcohol, n-propyl alcohol, isopropyl alcohol, n-butyl alcohol, and isobutyl alcohol; ketones and ketone alcohols, for example, acetone and diacetone alcohol; polyalkylene glycols, for example, polyethylene glycol and polypropylene glycols; alkylene glycols of which the alkylene group has 2 to 6 carbon atoms, for example, ethylene glycol, propylene glycol, butylene glycol, triethylene glycol, thiodiglycol, hexylene glycol and diethylene glycol; amide compounds, for example, dimethylformamide; ether compounds, for example, tetrahydrofuran, and lower alkyl ethers of polyhydric alcohols, for example, ethyleneglycol methyl-ether, diethyleneglycol methyl (or ethyl) ether, triethyleneglycol monomethyl ether.

EXAMPLES

The present invention will be further illustrated by the following examples.

Example Group I (Examples I-1 to I-13 and Comparative Examples I-1 to I-9)

In Example Group I, the following pigments were used.

(1) Silica colloidalb particles A-1

An aqueous colloidal solution of silica colloidal particles A-1 having a concentration of 8% by weight was prepared by dispersing wet method synthetic amorphous silica particles having an average primary particle size of 16 nm and an average secondary particle size of 9 $\mu$m and available under a trademark of Nipsil LP from Nihon Silica Kogyo K.K. in water and pulverizing the particles by repeating a combination of a sand grinder treatment and an ultrasonic homogenizer treatment until the average secondary size of the pulverized silica particles reached 50 nm.

(2) Silica colloidal particles B-1

An aqueous colloidal solution of silica colloidal particles B-1 having a concentration of 12% by weight was prepared by dispersing wet method synthetic amorphous silica particles having an average primary particle size of 21 nm and an average secondary particle size of 9 $\mu$m and available under a trademark of Nipsil NS from Nihon Silica Kogyo K.K. in water and pulverizing by repeating a combination of a sand grinder treatment and an ultrasonic homogenizer treatment until the average secondary size of the pulverized silica particles reached 100 nm.

(3) Silica colloidal particles C-1

An aqueous colloidal solution of silica colloidal particles C-1 having a concentration of 15% by weight was prepared by dispersing wet method synthetic amorphous silica particles having an average primary particle size of 11 nm and an average secondary particle size of 3 $\mu$m and available under a trademark of Nipsil HD-2 from Nihon Silica Kogyo K.K. in water and pulverizing by repeating a combination of a sand grinder treatment and an ultrasonic homogenizer treatment until the average secondary size of the pulverized silica particles reached 200 nm.

(4) Silica colloidal particles D-1

An aqueous colloidal solution of comparative silica colloidal particles D-1 having a concentration of 15% by weight was prepared by dispersing wet method synthetic amorphous silica particles having an average primary particle size of 16 nm and an average secondary particle size of 9 $\mu$m and available under a trademark of Nipsil LP from Nihon Silica Kogyo K.K. in water and pulverizing by repeating a combination of a sand grinder treatment and an ultrasonic homogenizer treatment until the average secondary size of the pulverized silica particles reached 500 nm.

(5) Aluminosilicate particles A

Isopropyl alcohol in an amount of 100 g was charged in a glass reactor having a capacity of 2 liters and equipped with a separable flask, 3 agitating blades each having a diameter of 3 cm and a thermometer and heated to a temperature of 60° C. by using an oil bath heater. Then, 5 g of aluminum isopropoxide was added to isopropyl alcohol while agitating the resultant reaction mixture with the 3 agitating blades at a rotation of 100 rpm. Thereafter, 1.0 g of an acid catalyst consisting of acetic acid was added to the reaction mixture and the agitation was continued, while refluxing at the above-mentioned temperature, for 24 hours.

Separately, 100 g of ion-exchanged water was charged in the same type of the glass reactor as mentioned above, and heated to a temperature of 60° C., 1.8 g of ethyl orthosilicate were added to the water, 1 g of an acid catalyst consisting of nitric acid was added to the resultant solution, and then the reactant reaction mixture was agitated at the above-mentioned temperature for 24 hours, while refluxing.

The ethyl orthosilicate-nitric acid-ion-exchanged water-reaction .product solution was mixed into the aluminum isopropoxide-acetic acid-isopropyl alcohol-reaction product solution, the resultant reaction mixture was agitated at a temperature of 60° C. for 6 hours, to produce aluminosilicate fine particles. The resultant dispersion was concentrated at a temperature of 60° C. in an evaporator, to obtain agglomerated secondary particles of aluminosilicate. In the aluminosilicate secondary particles, the molar ratio of alumina to silica was 3:2. The primary particles of the aluminosilicate had an average primary particle size of 10 nm.

The aluminosilicate secondary particles were diluted with water and pulverized by repeating a combination of a sand grinder treatment with an ultrasonic homogenizer treatment until the average secondary particle size of the aluminosilicate particles reached 60 nm. The resultant aqueous colloidal solution of the aluminosilicate secondary particles had a concentration of 8% by weight.

Example I-1

An aqueous silica colloidal coating solution having a solid content of 8% by solid weight was prepared from the silica colloidal solution A-1 in an amount of 100 parts by solid weight, and 40 parts by weight of polyvinyl alcohol (available under the trademark of PVA-124, from Kuraray Co., Ltd.) having a degree of polymerization of 2400 and a degree of saponification of 98.5%.

A substrate sheet was prepared by laminating a surface of a coated paper sheet (available under the trademark of OK Coat from OJI PAPER CO. Ltd.) having a basis weight of 127.9 g m$^2$ with a polyethylene resin layer having a thickness of 15 μm by an extrusion-laminating method. This polyethylene resin-laminated paper sheet will be referred to as a laminated paper sheet hereinafter.

The aqueous silica colloidal coating solution was coated on a surface of the laminated paper sheet by using a Mayer bar and dried to form an ink-receiving layer with a dry weight of 20 g/m$^2$.

An ink jet recording sheet was obtained.

Example I-2

An ink jet recording sheet was prepared by the same procedures as in Example I-1 except that in place of the polyvinyl alcohol (PVA-124), another polyvinyl alcohol (available under the trademark of PVA-117, from Kuraray Co., Ltd.) having a degree of polymerization of 1800 and a degree of saponification of 98.5% was used.

Example I-3

An ink jet recording sheet was prepared by the same procedures as in Example I-1 except that in place of the polyvinyl alcohol (PVA-124), another polyvinyl alcohol (available under the trademark of PVA-224, from Kuraray Co., Ltd.) having a degree of polymerization of 2400 and a degree of saponification of 88.5% was used.

Example I-4

An ink jet recording sheet was prepared by the same procedures as in Example I-1 except that in place of the polyvinyl alcohol (PVA-124), another polyvinyl alcohol (available under the trademark of PVA-135H, from Kuraray Co., Ltd.) having a degree of polymerization of 3500 and a degree of saponification of 99% or more was used.

Example I-5

An ink jet recording sheet was prepared by the same procedures as in Example I-1 except that in place of the polyvinyl alcohol (PVA-124), another polyvinyl alcohol (available under the trademark of PVA-140H, from Kuraray Co., Ltd.) having a degree of polymerization of 4000 and a degree of saponification of 99% or more was used.

Example I-6

An ink jet recording sheet was prepared by the same procedures as in Example I-1 except that an aqueous silica colloidal coating solution having a solid content of 12% by weight was prepared from the silica colloidal solution B-1 in an amount of 100 parts by solid weight and 40 parts by weight of the polyvinyl alcohol (PVA-124), and coated on the laminated paper sheet to form an ink-receiving layer in a dry amount of 20 g/m$^2$.

Example I-7

An ink jet recording sheet was prepared by the same procedures as in Example I-1 except that an aqueous silica colloidal coating solution having a solid content of 15% by weight was prepared from the silica colloidal solution C-1 in an amount of 100 parts by solid weight and 40 parts by weight of the polyvinyl alcohol (PVA-124), and coated on the laminated paper sheet to form an ink-receiving layer in a dry weight of 20 g/m$^2$.

Example I-8

An ink jet recording sheet was prepared by the same procedures as in Example I-1 except that the aqueous silica colloidal coating solution was coated on a surface of a shaping base consisting of a polyethylene terephthalate film (available-under the trademark of Lumilar T from Toray) having a thickness of 75 μm and a surface roughness Ra of 0.02 μm, and dried, to form a coating layer having a dry weight of 20 g/m$^2$.

Then, an polyacrylic acid adhesive (available under the trademark of A-02, from Nihon Carbide Kogyo K.K.) was coated on a surface of the dried colloidal silica layer and dried to form an intermediate layer having a dry weight of 10 g/m$^2$.

The intermediate layer on the dried colloidal silica layer was superposed on and press-bonded to the laminated paper sheet under a linear pressure of 50 kg/cm by using a calender. Then the resultant laminate was separated from the shaping base film, to provide an ink jet recording sheet.

Example I-9

An aqueous aluminosilicate colloidal solution having a solid content of 8% by weight was prepared from the aluminosilicate colloidal solution A in an amount of 100 parts by solid weight and 40 parts by weight of polyvinyl alcohol (available under the trademark of PVA-135H, from Kuraray Co., Ltd.) having a degree of polymerization of 3500 and a degree of saponification of 99% or more.

The aqueous aluminosilicate colloidal coating solution was coated on a surface of the laminated paper sheet by using a Mayer bar and dried to form an ink-receiving layer with a dry weight of 20 g/m².

An ink jet recording sheet was obtained.

Comparative Example I-1

An ink jet recording sheet was prepared by the same procedures as in Example I-1 except that an aqueous silica colloidal coating solution having a solid content of 15% by weight was prepared from the silica colloidal solution D-1 in an amount of 100 parts by solid weight and 40 parts by weight of the polyvinyl alcohol (PVA-124), and coated on the laminated paper sheet to form an ink receiving layer in a dry weight of 20 g/m².

Comparative Example I-2

An ink jet recording sheet was prepared by the same procedures as in Example I-1 except that an aqueous silica dispersion having a solid content of 15% by weight was prepared from 100 parts by solid weight of wet method synthetic amorphous silica particles (available under a trademark of Nipsil HD-2, from Nihon Silica Kogyo K.K.) having an average primary particle size of 11 nm and an average secondary particle size of 3 μm and 40 parts by weight of polyvinyl alcohol (PVA-124), and coated on a surface of the laminated paper sheet by using a Mayer bar and dried to form an ink-receiving layer having a dry weight of 20 g/m².

Comparative Example I-3

An ink jet recording sheet was prepared by the same procedures as in Example I-1 except that an aqueous silica dispersion having a solid content of 15% by weight was prepared from 100 parts by solid weight of wet method synthetic amorphous silica particles (available under a trademark of Nipsil LP, from Nihon Silica Kogyo K.K.) having an average primary particle size of 16 nm and an average secondary particle size of 9 μm, and 40 parts by weight of polyvinyl alcohol (PVA-124), and coated on a surface of the laminated paper sheet by using a Mayer bar and dried to form an ink-receiving layer having a dry weight of 20 g/m².

Comparative Example I-4

An ink jet recording sheet was prepared by the same procedures as in Example I-1 except that an aqueous alumina dispersion having a solid content of 8% by weight was prepared from 100 parts by solid weight of primary alumina particles (available under a trademark of Alumina sol-100, from Nissan Kagakukogyo K.K.) having average minor and major axes of primary particles of 10 nm and 100 nm, respectively, and 40 parts by weight of polyvinyl alcohol (PVA-124), and coated on a surface of the laminated paper sheet by using a Mayer bar and dried to form an ink-receiving layer having a dry weight of 20 g/m².

Comparative Example I-5

An ink jet recording sheet was prepared by the same procedures as in Example I-1 except that an aqueous silica dispersion having a solid content of 15% by weight was prepared from 100 parts by solid weight of an anionic primary silica particle colloidal solution (available under a trademark of Snowtex YL, from Nissan Kagakukogyo K.K.) having an average primary particle size of 65 nm, and 10 parts by weight of polyvinyl alcohol (PVA-124), and coated on a surface of the laminated paper sheet by using a Mayer bar and dried to form an ink-receiving layer having a-dry weight of 20 g/m².

Comparative Example I-6

An aqueous coating liquid having a solid content of 15% by weight was prepared from 100 parts by solid weight of the silica colloidal solution A-1 and 100 parts by solid weight of a styrene-butadiene copolymer latex (trademark: Nipol LX 415A, made from Nihon Zeon Co., Ltd.) having an average particle size of 110 nm and a Tg of 27° C.

The aqueous coating layer was coated on a surface of the laminated paper sheet by using a Mayer bar and dried to form an ink-receiving layer having a dry weight of 20 g/m². An ink jet recording sheet was obtained.

Comparative Example I-7

An aqueous solution of 10% by weight of a polyvinyl alcohol having a degree of polymerization of 1800 and a degree of saponification of 98.5% (available under a trademark of PVA-117, from Kuraray Co., Ltd.) was coated on a surface of the laminated paper sheet by using a Mayer bar to form an ink-receiving layer having a dry weight of 20 g/m². An ink jet recording sheet was obtained.

Comparative Example I-8

A gloss ink jet recording sheet having an ink-fixing layer and a gloss layer (available under the trademark of GP-101, from Canon Corp.) was subjected to the tests explained below.

Comparative Example I-9

An ink jet recording sheet was prepared by the following procedures.

(1) Composition of a coating solution for forming an ink-receiving layer

| | |
|---|---|
| (i) Dry method silica fine particles (average primary particle size: 7 nm, refractive index: 1.45, number of silanol groups on surface: 2–3/nm², trademark: Aerosil A300 (available from Nippon Aerosil Co., Ltd.)) | 10 parts by weight |
| (ii) Polyvinyl alcohol (saponification degree: 88%, polymerization degree: 3,500, trademark: PVA23 (available from Kuraray Co., Ltd.)) | 3.3 parts by weight |
| (iii) Ion exchanged water | 136.0 parts by weight |

The dry method silica fine particles (i) are introduced into a part of the ion exchanged water (iii) (73.3 parts by weight) and dispersed therein at 10,000 rpm for 20 minutes using a high-speed rotary wet colloid mill (Creamix, produced by M Technique Co. Ltd.). To the resulting dispersion was added an aqueous polyvinyl alcohol solution (solution obtained by dissolving polyvinyl alcohol in the remainder (62.7 parts by weight) of the ion exchanged water (iii)), and dispersing was carried out. Then, pH was adjusted to 4 to 5, to obtain a coating solution for forming an ink-receiving layer.

(2) Coating and drying

The coating solution was coated on a surface of the same laminated paper sheet as in Example I-1 by using a Mayer bar and dried to form an ink-receiving layer having a dry weight of 20 g/m$^2$. An ink jet recording sheet was obtained.

The ink jet recording sheets of Examples I-1 to I-9 and Comparative Examples I-1 to I-9 were subjected to the following water-resistance, ink-absorption and ink absorption capacity tests.

The specimens of the ink recording sheets of Examples I-1 to I-9 and Comparative Examples I-1 to I-7 were calender-treated under a linear pressure of 20 kg/cm before the tests.

The gloss and ink-absorbing properties were represented by a gloss, an ink-absorption and color density of ink images of a solid printed portion of the specimen printed by a practical ink jet printer (trademark: BJC-600J, made by Canon Inc.).

[Water resistance]

A water drop was placed on the ink-receiving layer surface of the specimen, 30 minutes after the water drop-placing, the water drop was wiped out, the water drop-placed portion of the specimen was rubbed with a finger, and the rubbing result was evaluated in the following four classes.

4 . . . No change appears in the ink-receiving layer portion.

3 . . . The ink-receiving layer portion was slightly removed.

2 . . . The ink-receiving layer portion was certainly removed.

1 . . . The ink-receiving layer portion was completely removed.

[Ink absorption]

(a) Ink absorbing rate

Each of yellow, magenta and cyan-colored inks was printed on the specimen, every 5 seconds after the printing, a woodfree paper sheet was put on the ink-printed portion of the specimen, and it was observed whether or not the ink was transferred to the paper sheet. The time necessary to completely fix the ink in the ink receiving layer so that no ink transfer occurred on the specimen was determined. The ink absorption rate was evaluated in four classes as follows.

4 . . . Less than 5 seconds

3 . . . 5 seconds or more but less than 10 seconds

2 . . . 10 seconds or more but less than 30 seconds

1 . . . 30 seconds or more

The specimen having an ink-fixing time of less than 10 seconds is evaluated as to be excellent in ink-absorbing rate.

(b) Ink absorption capacity

On a portion having an area of 10 cm×10 cm of a A4 size specimen, yellow, magenta and cyan-colored inks were successively solid-printed. To observe whether or not the inks flowed out from the solid printed portion of the specimen, a woodfree paper sheet was put on the solid printed portion of the specimen at each stage of immediately one minute, 2 minutes and 5 minutes after the printing, and it was observed whether or not the inks were transferred to the paper sheet, to determine the time necessary to completely fix the inks in the ink-receiving layer so that no ink transfer occurred to the paper sheet. The results were evaluated in the following four classes.

4 . . . Less than one minute

3 . . . One minute or more but less than 2 minutes

2 . . . 2 minutes or more but less than 5 minutes

1 . . . 5 minutes or more

[Color density of ink images]

A solid printing was applied with a black colored ink on the specimen.

The color density of the black colored ink images was measured by using a Macbeth reflection color density tester (Model RD-920). The measurement was repeated 5 times and the color density was represented by an average value of the measured values.

[Gloss of printed portion]

The gloss of ink-printed portion of the specimen was determined by observing the ink-printed portion at an angle of 20 degrees from the surface of the specimen by the naked eye and evaluated in the following four classes.

4 . . . very high gloss substantially equal to the gloss of conventional full color-printed silver salt type photographic printing sheets 3 . . . High gloss but slightly lower than the gloss of the full color printed photographic printing sheets 2 . . . Similar to the gloss of printed coated paper sheets 1 . . . Similar to the gloss of printed PPC sheets

[Form of ink dots]

The form of the printed ink dots was observed by a microscope at a magnification of 100 to 200.

The test results are shown in Table 1.

TABLE 1

| | | Ink absorption | | | | | |
|---|---|---|---|---|---|---|---|
| Example No. | | Ink absorption rate | Ink absorption capacity | Water resistance | Color density of ink images | Gloss of printed portion | Form of ink dots |
| Example | I-1 | 4 | 4 | 4 | 2.20 | 3 | True circle |
| | I-2 | 3 | 3 | 4 | 2.19 | 3 | " |
| | I-3 | 4 | 4 | 3 | 2.19 | 3 | " |
| | I-4 | 4 | 4 | 4 | 2.23 | 3 | " |
| | I-5 | 4 | 4 | 4 | 2.23 | 3 | " |
| | I-6 | 4 | 4 | 4 | 1.91 | 3 | " |
| | I-7 | 4 | 4 | 4 | 1.70 | 3 | " |
| | I-8 | 4 | 4 | 4 | 2.27 | 3 | " |
| | I-9 | 4 | 4 | 4 | 2.12 | 3 | " |
| Comparative | I-1 | 4 | 4 | 4 | 1.15 | 3 | True circle |
| Example | I-2 | 4 | 4 | 2 | 1.30 | 1 | Irregular (cloud-like) |

TABLE 1-continued

| Example No. | Ink absorption | | Water resistance | Color density of ink images | Gloss of printed portion | Form of ink dots |
| --- | --- | --- | --- | --- | --- | --- |
| | Ink absorption rate | Ink absorption capacity | | | | |
| I-3 | 4 | 4 | 2 | 1.21 | 1 | Irregular (cloud-like) |
| I-4 | 1 | 1 | 4 | 2.25 | 3 | True circle |
| I-5 | 4 | 1 | 4 | 1.87 | 3 | " |
| I-6 | 1 | 2 | 4 | 2.06 | 3 | " |
| I-7 | 1 | 1 | 1 | 2.40 | 2 | circle |
| I-8 | 4 | 4 | 4 | 1.41 | 2 | Irregular (cloud-like) |
| I-9 | 2 | 4 | 2 | 2.10 | 2 | Irregular (cloud-like) |

Table 1 clearly shows that in the ink jet recording sheets of Examples I-1 to I-9 in accordance with the present invention, the ink-receiving layers had satisfactory ink-absorbing properties and water resistance, the ink dots had a true circle form and the printed ink images had a high gloss, a high color density, and satisfactory clarity and sharpness. However, the ink jet recording sheets of Comparative examples were unsatisfactory in one or more of the above-tested performances.

The above-mentioned excellent properties of the ink jet recording material of the present invention are derived from the specific silica or aluminosilicate colloidal particles contained in the ink-receiving layer. The secondary particles of silica or aluminosilicate usable for the present invention each comprising a plurality of primary particles which have a sphere form, exhibit an enhanced film-forming property and ink-absorbing property and thus the resultant ink-receiving layer exhibits a high resistance to cracking and excellent ink-absorbing property and the ink images recorded in the ink-receiving layer have high color density and clarity.

Example Group II (Examples II-1 to II-8 and Comparative Examples II-1 to II-4)

In Example Group II, the following pigments were used.

(1) Silica colloidal particles A-2

An aqueous colloidal dispersion of silica colloidal particles A-2 having a concentration of 8% by weight was prepared by dispersing wet method synthetic amorphous silica particles having an average primary particle size of 13 nm and an average secondary particle size of 2 μm and available under a trademark of Nipsil HD from Nihon Silica Kogyo K.K. in water and pulverizing by repeating a combination of a sand grinder treatment and an ultrasonic homogenizer treatment until the average secondary size of the pulverized silica particles reached 40 nm.

(2) Silica colloidal particles B-2

An aqueous colloidal dispersion of silica colloidal particles B-2 having a concentration of 12% by weight was prepared by.-dispersing wet method synthetic amorphous silica particles having an average primary particle size of 15 nm and an average secondary particle size of 2.2 μm and available under a trademark of Nipsil K-300 from Nihon-Silica Kogyo K.K. in water and pulverizing by repeating a combination of a sand grinder treatment and an ultrasonic homogenizer treatment until the average secondary size of the pulverized silica particles reached 90 nm.

(3) Silica colloidal particles C-2

An aqueous colloidal dispersion of silica colloidal particles C-2 having a concentration of 12% by weight was prepared by dispersing wet method synthetic amorphous silica particles having an average primary particle size of 24 nm and an average secondary particle size of 1.5 μm and available under a trademark of Nipsil E-1011 from Nihon Silica Kogyo K.K. in water and pulverizing by repeating a combination of a sand grinder treatment and an ultrasonic homogenizer treatment until the average secondary size of the pulverized silica particles reached 120 nm.

(4) Silica colloidal particles D-2

An aqueous colloidal dispersion of silica colloidal particles D-2 having a concentration of 15% by weight was prepared by dispersing wet method synthetic amorphous silica particles having an average primary particle size of 13 nm and an average secondary particle size of 2 μm and available under a trademark of Nipsil HD from Nihon Silica Kogyo K.K. in water and pulverizing by repeating a combination of a sand grinder treatment and an ultrasonic homogenizer treatment until the average secondary size of the pulverized silica particles reached 240 nm.

(5) Aluminosilicate colloidal particles A

They are as mentioned above.

Example II-1

An aqueous silica colloidal coating solution having a solid content of 8% by weight was- prepared from the silica colloidal dispersion A-2 in an amount of 100 parts by solid weight and 40 parts by weight of polyvinyl alcohol (available under the trademark of PVA-135H, from Kuraray Co., Ltd.) having a degree of polymerization of 3500 and a degree of saponification of 99% or more.

A substrate sheet was prepared by laminating a surface of a coated paper sheet (available under the trademark of OK-Coat from OJI PAPER CO., Ltd.) having a basis weight of 127.9 g/m$^2$ with a polyethylene resin layer having a thickness of 15 μm by an extrusion-laminating method. This polyethylene resin-laminated paper sheet will be referred to as a laminated paper sheet hereinafter.

The aqueous silica colloidal coating solution was coated on a surface of the laminated paper sheet by using a Mayer bar and dried to form an ink-receiving layer with a dry weight of 20 g/m$^2$.

An ink jet recording sheet was obtained.

A pore radius distribution curve was prepared for the resultant ink-receiving layer. In this curve, a peak corresponding to a pore radius of 8 nm was found as shown in FIG. 1. The measurement of the pore radius was carried out for the pore radius of from 3 nm to 100 μm. In this measurement, only one peak was found at the pore radius of 8 nm.

In the ink-receiving layer, the integrated pore volume of all the pores was about 0.86 ml/g and the total volume of the pores having a pore radius of from 3 to 20 nm was 0.6 ml/g.

Example II-2

An ink jet recording sheet was produced by the same procedures as in Example II-1, except that an aqueous silica colloidal coating solution having a solid content of 12% by weight was prepared from the silica colloidal dispersion B-2 in an amount of 100 parts by solid weight and 40 parts by weight of the polyvinyl alcohol (PVA-135H), and coated on the laminated paper sheet by a Mayer bar and dried, to form an ink-receiving layer having a dry weight of 20 g/m$^2$. The pore radius distribution curve of the ink-receiving layer had a peak corresponding to a pore radius of 18 nm.

Example II-3

An ink jet recording sheet was produced by the same procedures as in Example II-1, except that an aqueous silica colloidal coating solution having a solid content of 12% by weight was prepared from the silica colloidal dispersion C-2 in an amount of 100 parts by solid weight and 40 parts by weight of the polyvinyl alcohol (PVA-135H), and coated on the laminated paper sheet by a Mayer bar and dried, to form an ink-receiving layer having a dry weight of 20 gm$^2$. The pore radius distribution curve of the resultant ink-receiving layer had two peaks corresponding to pore radiuses of 4 nm and 35 nm. The ink-receiving layer had an integrated pore volume of 1.1 ml/g and a total volume of the pores having a pore radius of 3 to 20 nm of 0.6 ml/g.

Example II-4

An ink jet recording sheet was produced by the same procedures as in Example II-1, except that an aqueous aluminosilicate colloidal coating solution having a solid content of 8% by weight was prepared from the aluminosilicate colloidal dispersion A in an amount of 100 parts by solid weight and 40 parts by weight of the polyvinyl alcohol (PVA-135H), and coated on the laminated paper sheet by a Mayer bar and dried, to form an ink-receiving layer having a dry weight of 20 g/m$^2$. The pore radius distribution curve of the resultant ink-receiving layer had a peak corresponding to a pore radius of 10 nm.

Example II-5

An ink jet recording sheet was produced by the same procedures as in Example II-1, except that an aqueous silica colloidal coating solution having a solid content of 8% by weight was prepared from the silica colloidal dispersion A-2 in an amount of 100 parts by solid weight and 40 parts by weight of the polyvinyl alcohol (PVA-135H), and coated on a surface of a shaping base consisting of a polyethylene terephthalate (PET) film having a thickness of 75 μm and a surface roughness of 0.02 μm (trademark: Lumilar T, made by Toray Industries, Inc.) by a Mayer bar and dried, to form a coating layer corresponding to an ink-receiving layer and having a dry weight of 20 g/m$^2$.

Separately, a surface of the laminated paper sheet was coated with an acrylic ester adhesive (trademark: A-02, made by Nippon Carbide Industries Co., Inc.) and dried to form an intermediate layer in a dry amount of 10 g/m$^2$.

Then, the intermediate layer of the laminated paper sheet was superposed on and press-bonded to the coating layer on the shaping base under a linear pressure of 20 kg/cm by using a calender. The resultant laminate was separated from the shaping base, to provide an ink jet recording sheet. The pore radius distribution curve of the ink-receiving layer had a peak corresponding to a pore radius of 8 nm.

Example II-6

An ink jet recording sheet was produced by the same procedures as in Example II-1, except that an aqueous silica colloidal coating solution having a solid content of 8% by weight was prepared from the silica colloidal dispersion A-2 in an amount of 100 parts by solid weight and 40 parts by weight of the polyvinyl alcohol (PVA-135H), and coated on a surface of the same shaping base as in Example II-5 by a Mayer bar and dried, to form a coating layer corresponding to an ink-receiving layer having a dry weight of 10 g/m$^2$.

On the coating layer- on the shaping base, an aqueous silica -colloidal coating solution prepared from the silica colloidal dispersion B-2 in an amount of 100 parts by solid weight and the polyvinyl alcohol (PVA-135H) in an amount of 40 parts by solid weight and having a solid content of 12% by solid weight was coated by using a Mayer bar and dried, to form an additional coating layer corresponding to an additional ink-absorbent layer and having a dry weight of 20 g/m$^2$.

Separately, a surface of the laminated paper sheet was coated with an acrylic ester adhesive (trademark: A-02, made by Nihon Carbide Kogyo K.K.) and dried to form an intermediate layer in a dry amount of 10 g/m$^2$.

Then, the intermediate layer of the laminated paper sheet was superposed on and press-bonded to the additional coating layer of the shaping base under a linear pressure of 20 kg/cm by using a calender. The resultant laminate was separated from the shaping base, to provide an ink jet recording sheet. The pore radius distribution curve of the ink-receiving layer had a peak corresponding to a pore radius of 8 nm.

Example II-7

An ink jet recording sheet was produced by the same procedures as in Example II-1, except that an aqueous silica colloidal coating solution having a solid content of 8% by weight was prepared from the silica colloidal dispersion A-2 in an amount of 100 parts by solid weight and 40 parts by weight of the polyvinyl alcohol (PVA-135H), and coated on the surface of the same shaping base as in Example II-5 by a Mayer bar and dried, to form a coating layer corresponding to an ink-receiving layer having a dry weight of 20 g/m$^2$.

On the surface of the coating layer formed on the shaping base, an aqueous silica dispersion prepared from 100 parts by solid weight of wet method synthetic amorphous silica particles having an average primary particle size of about 15 nm and an average secondary particle size of 4.5 μm (available under a trademark of Finesil X-45, from Tokuyama Corp.) and 40 parts by solid weight of a polyvinyl alcohol having a degree of polymerization of 1800 and a degree of saponification of 98.5% (available under a trademark of PVA-117, from Kuraray Co., Ltd.), and having a solid content of 15% by weight, was coated by using a Mayer bar and dried, to form an additional coating layer corresponding an additional ink-absorbent layer, having a dry weight of 10 g/m$^1$.

Separately, a surface of the laminated paper sheet was coated with an acrylic ester adhesive (trademark: A-02, made by Nihon Carbide Kogyo K.K.) and dried to form an intermediate layer in a dry amount of 10 g/m².

Then, the intermediate layer of the laminated paper sheet was superposed on and press-bonded to the additional coating layer of the shaping base under a linear pressure of 20 kg/cm by using a calender. The resultant laminate was separated from the shaping base, to provide an ink jet recording sheet. The pore radius distribution curve of the ink-receiving layer had a peak corresponding to a pore radius of 8 nm.

Example II-8

An ink jet recording sheet was produced by the following procedures. An aqueous silica colloidal coating solution having a solid content of 12% by weight was prepared from the silica colloidal dispersion D-2 in an amount of 100 parts by solid weight and 40 parts by weight of the polyvinyl alcohol (PVA-135H), and coated on the laminated paper sheet by a Mayer bar and dried, to form an ink-receiving layer having a dry weight of 20 g/m². The pore radius distribution curve of the ink-receiving layer had a peak corresponding to a pore radius of 45 nm.

Comparative Example II-1

An ink jet recording sheet was produced by the same procedures as in Example II-1, except that an aqueous silica coating solution having a solid content of 15% by weight was prepared from wet method synthetic amorphous silica particles having an average primary particle size of about 15 nm and an average secondary particle size of 4.5 µm (trademark: Finesil X-45, Tokuyama Corp.) in an amount of 100 parts by solid weight and 40 parts by weight of a polyvinyl alcohol having a degree of polymerization of 1800 and a degree of saponification of 98.5% (trademark: PVA-117, made by Kuraray Co., Ltd.), and coated on the laminated paper sheet by a Mayer bar and dried, to form an ink-receiving layer having a dry weight of 20 g/m². The pore radius distribution curve of the ink-receiving layer had three peaks corresponding to pore radiuses of 5 nm, 0.32 µm and 1.4 µn. In the ink-receiving layer, the integrated pore volume of all the pore was 0.75 ml/g and the total volume of pores having a pore radius of 4 to 20 nm was 0.09 ml/g.

Comparative Example II-2

An ink jet recording sheet was produced by the same procedures as in Example II-1, except that an aqueous pseudoboehmite dispersion having a solid content of 5% by weight was prepared from a pseudoboehmite sol having an average primary particle size of 10 nm×100 nm (trademark: AS-520, made by Nissan Kagakukogyo K.K.) in an amount of 100 parts by solid weight and 10 parts by weight of the polyvinyl alcohol (PVA-135H), and coated on the laminated paper sheet by a Mayer bar and dried, to form an ink-receiving layer having a dry weight of 20 g/m². The pore radius distribution curve of the resultant ink-receiving layer had a peak corresponding to a pore radius of 7 nm.

Comparative Example II-3

An ink jet recording sheet was produced by the same procedures as in Example II-1, except that an aqueous silica colloidal coating solution having a solid content of 15% by weight was prepared from an anionic primary colloidal silica particles having an average primary particle size of 80 nm (trademark: Snowtex ZL, made by Nissan Kagakukogyo K.K.) in an amount of 100 parts by solid weight and 10 parts by weight of the polyvinyl alcohol (PVA-135H), and coated on the laminated paper sheet by a Mayer bar and dried, to form an ink-receiving layer having a dry weight of 20 g/m². The pore radius distribution curve of the ink-receiving layer had a peak corresponding to a pore radius of 13 nm.

Comparative Example II-4

A gloss ink jet recording sheet having an ink-fixing layer and a gloss layer (available under the trademark of GP-101 from Canon Corp.) was subjected to the following tests. The ink-fixing layer exhibited a pore radius distribution curve having a peak corresponding to a pore radius of 5 µm.

Tests

Specimens of the ink jet recording sheets of Examples II-1 to II-8 and Comparative Examples II-1 to II-4 were subjected to the following tests for water resistance, the gloss, the ink-absorbing rate and ink-absorption capacity of the ink-receiving layer.

These specimens except for the specimen of Comparative Examples II-4 were surface-smoothed by using a super calender under a linear pressure of 70 kg/cm, before the tests.

The gloss and ink-absorption properties were tested by solid printing the specimens of the ink-jet recording sheets by a practical ink jet printer (trademark: BJC-610J, made by Canon Corp., 720 dpi×720 dpi) and the gloss, the ink-absorption properties and color density of the solid printed ink images were measured.

[Water resistance]

The test for water resistance was the same as in Example Group I.

[Ink absorption]

The test for ink-absorbing rate was the same as in Example Group I.

In the test for the ink absorption capacity, the surfaces of the specimens were solid printed with a black-colored ink in an ink-jetting amount of 30 g/m².

[Color density]

The test for color density of the printed ink images was the same as in Example Group I.

[Gloss]

The test for gloss of the ink-printed portion of the ink jet recording sheet was the same as in Example Group I.

The test results are shown in Table 2.

TABLE 2

| Example No. | | Ink-absorption | | Water resistance | Color density | Gloss printed portion | Pore radius corresponding to peak in pore radius distribution curve |
|---|---|---|---|---|---|---|---|
| | | Ink-absorbing rate | Ink-absorption capacity | | | | |
| Example | II-1 | 4 | 3 | 4 | 2.20 | 3 | 8 nm |
| | II-2 | 4 | 3 | 4 | 1.99 | 3 | 18 nm |
| | II-3 | 4 | 3 | 4 | 1.85 | 3 | 4, 35 nm |
| | II-4 | 4 | 3 | 4 | 2.12 | 3 | 10 nm |
| | II-5 | 4 | 3 | 4 | 2.25 | 4 | 8 nm |
| | II-6 | 4 | 4 | 4 | 2.22 | 4 | 8 nm |
| | II-7 | 4 | 4 | 4 | 2.19 | 3 | 8 nm |
| | II-7 | 4 | 3 | 4 | 1.70 | 3 | 45 nm |
| Comparative Example | II-1 | 4 | 3 | 2 | 1.27 | 1 | 5 nm 0.32 µm 1.40 µm |
| | II-2 | 2 | 1 | 4 | 2.21 | 3 | 7 nm |
| | II-3 | 4 | 1 | 4 | 1.85 | 3 | 13 nm |
| | II-4 | 4 | 3 | 4 | 1.41 | 2 | 5 µm |

Table 2 clearly shows that in Examples II-1 to II-8 in accordance with the present invention, the resultant ink jet recording materials had a high ink-absorbing rate and a high ink-absorption capacity and could receive thereon ink images having a high gloss, color density, clarity and sharpness.

Example Group III (Examples III-1 to III-9 and Comparative Examples III-1 to III-3)

In Example Group III, the following pigments were employed.

(1) Silica colloidal particles A-3

An aqueous colloidal dispersion of silica colloidal particles A-3 having a concentration of 8% by solid weight was prepared by dispersing wet method synthetic amorphous silica particles having an average primary particle size of 15 nm and an average secondary particle size of 2.2 µm and available under a trademark of Nipsil K-300 from Nihon Silica Kogyo K.K. in water and pulverizing by repeating a combination of a sand grinder treatment and an ultrasonic homogenizer treatment until the average secondary size of the pulverized silica particles reached 40 nm.

(2) Silica colloidal particles B-3

An aqueous colloidal solution of silica colloidal particles B-3 having a concentration of 12% by solid weight was prepared by dispersing wet method synthetic amorphous silica particles having an average primary particle size of 24 nm and an average secondary particle size of 2.5 µm and available under a trademark of Nipsil E-220A from Nihon Silica Kogyo K.K. in water and pulverizing by repeating a combination of a sand grinder treatment and an ultrasonic homogenizer treatment until the average secondary size of the pulverized silica particles reached 80 nm.

(3) Silica colloidal particles C-3

An aqueous colloidal solution of silica colloidal particles C-3 having a concentration of 12% by solid weight was prepared by dispersing the same synthetic amorphous silica particles as for the silica colloidal particles B-3 in water and pulverizing by repeating a combination of a sand grinder treatment and an ultrasonic homogenizer treatment until the average secondary size of the pulverized silica particles reached 150 nm.

(4) Silica colloidal particles D-3.

An aqueous colloidal dispersion of silica colloidal particles D-3 having a concentration of 12% by weight was prepared by dispersing the same synthetic amorphous silica particles as for the silica colloidal particles A-3 in water and pulverizing by repeating a combination of a sand grinder treatment and an ultrasonic homogenizer treatment until the average secondary size of the pulverized silica particles reached 190: nm.

(5) Silica colloidal particles E-3

An aqueous colloidal solution of silica colloidal particles E-3 having a concentration of 15% by weight was prepared by dispersing wet method synthetic amorphous silica particles having an average primary particle size of 30 nm and an average secondary particle size of 3 µm and available under a trademark of Nipsil E-170 from Nihon Silica Kogyo K.K. in water and pulverizing by repeating a combination of a sand grinder treatment and an ultrasonic homogenizer treatment until the average secondary size of the pulverized silica particles reached 240 nm.

(6) Aluminosilicate particle A

This is the same as in Example Group I.

Example III-1

An aqueous silica colloidal coating solution having a solid content of 8% by weight was prepared from the. silica colloidal dispersion A-3.in an amount of 100 parts by solid weight and a polyvinyl alcohol having a degree of polymerization of 2400 and a degree of saponification of 98.5% or more (trademark: PVA-124, made by Kuraray Co., Ltd.).

A substrate sheet was prepared by laminating a surface of a coated paper sheet (trademark: OK Coat, made by OJI PAPER CO. Ltd.) having a basis weight of 127.9 g/m², with a polyethylene resin layer having a thickness of 15 µm by an extrusion-laminating method. This polyethylene resin-laminated paper sheet will be referred to as a laminated paper sheet hereinafter.

The aqueous coating solution was coated on a surface of the laminated paper sheet by using a Mayer bar and dried to form an ink-receiving layer with a dry weight of 15 g/m².

An ink jet recording sheet was obtained.

Example III-2

An ink jet recording sheet was prepared by the same procedures as in Example III-1, except that an aqueous silica colloidal coating solution having a solid content of 12% by weight was prepared from the silica colloidal dispersion B-3 in an amount of 100 parts by solid weight and a polyvinyl alcohol having a degree of polymerization of 3500 and a degree of saponification of 99% or more (trademark: PVA-135, made by Kuraray Co., Ltd.) in an amount of 25 parts by solid weight, and coated on the laminated paper sheet by using a Mayer bar and dried to form an ink-receiving layer having a dry weight of 15 g/m$^2$.

Example III-3

An ink jet recording sheet was prepared by the same procedures as in Example III-1, except that an aqueous silica colloidal coating solution having a solid content of 12% by weight was prepared from the silica colloidal dispersion C-3 in an amount of 100 parts by solid weight and the polyvinyl alcohol (PVA-124) in an amount of 50 parts by solid weight, and coated on the laminated paper sheet by using a Mayer bar and dried to form an ink-receiving layer having a dry weight of 15 g/m$^2$.

Example III-4

An ink jet recording sheet was prepared by the same procedures as in Example III-1, except that in the preparation of the an aqueous silica colloidal coating solution having a solid content of 12% by weight, the silica colloidal dispersion A-3 was replaced by the silica colloidal dispersion D-3.

Example III-5

An ink jet recording sheet was prepared by the same procedures as in Example III-1, except that an aqueous aluminosilicate colloidal coating solution having a solid content of 8% by weight was prepared from the aluminosilicate colloidal dispersion A in an amount of 100 parts by solid weight and the polyvinyl alcohol (PVA-124) in an amount of 40 parts by solid weight, and (coated on the laminated paper sheet by using a Mayer bar and dried to form an ink-receiving layer having a dry weight of 15 g/m$^2$.

Example III-6

An ink jet recording sheet was prepared by the same procedures as in Example III-1, except that an aqueous silica colloidal coating solution having a solid content of 8% by weight was prepared from the silica colloidal dispersion A-3 in an amount of 100 parts by solid weight and the polyvinyl alcohol (PVA-124) in an amount of 40 parts by solid weight, and coated on a surface of a shaping base consisting of a polyethylene terephthalate film (trademark: Lumilar T, made by Toray) having a thickness of 75 µm and a surface roughness Ra of 0.02 µm by using a Mayer bar, and dried to form a coating layer corresponding to an ink-receiving layer, having a dry weight of 15 g/m$^2$.

Separately, a surface of the laminated paper sheet was coated with an acrylic acid adhesive (trademark: A-02, made by Nihon Carbide Kogyo K.K.) and dried, to form an intermediate layer having a dry weight of 10 g/m$^2$.

The intermediate layer on the laminated paper sheet was superposed on and press-bonded to the coating layer formed on the shaping base under a linear pressure of 20 kg/cm by using a calender. Then the shaping base film was removing from the resultant laminate to leave an ink jet recording sheet.

Example III-7

An ink jet recording sheet was prepared by the same procedures as in Example III-1, except that an aqueous silica colloidal coating solution having a solid content of 8% by weight was prepared from the silica colloidal dispersion A-3 in an amount of 100. parts by solid weight and the polyvinyl alcohol (PVA-124) in an amount of 70 parts by solid weight, and coated on the laminated paper sheet by using a Mayer bar and dried to form an ink-receiving layer having a dry weight of 15 g/cm$^2$.

Example III-8

An ink jet recording sheet was prepared by the same procedures as in Example III-1, except that an aqueous silica colloidal coating solution having a solid content of 15% by weight was prepared from the silica colloidal dispersion E-3 in an amount of 100 parts by solid weight and the polyvinyl alcohol (PVA-124) in an amount of 40 parts by solid weight, and coated on the laminated paper sheet by using a Mayer bar and dried to form an ink-receiving layer having a dry weight of 15 g/m$^2$.

Example III-9

An ink jet recording sheet was prepared by the same procedures as in Example III-1, except that the same aqueous silica colloidal coating solution as in Example III-2 was coated on the laminated paper sheet by using a Mayer bar and dried to form an additional ink-absorbent layer having a dry weight of 10 g/m$^2$. Then, the same aqueous silica colloidal solution as in Example III-1 was coated on the additional ink-absorbent layer to form an ink-receiving layer having a dry weight of 10 g/m$^2$.

Comparative Example III-1

An ink jet recording sheet was prepared by the same procedures as in Example III-1, except that an aqueous silica coating solution having a solid content of 15% by weight was prepared from a wet method synthetic amorphous silica particles (trademark: Finesil X-45, made by Tokuyama K.K.) having an average primary particle size of about 15 nm and an average secondary particle size of 4.5 µm in an amount of 100 parts by solid weight and a polyvinyl alcohol having a degree of polymerization of 1800 and a degree of saponification of 98.5% (trademark: PVA-117, made by Kuraray Co., Ltd.) in an amount of 30 parts by solid weight, and coated on the laminated paper sheet by using a Mayer bar and dried to form an ink-receiving layer having a dry weight of 15 g/m$^2$.

Comparative Example III-2

An ink jet recording sheet was prepared by the same procedures as in Example III-1, except that an aqueous pseudoboehmite coating dispersion having a solid content of 5% by weight was prepared from a pseudoboehmite sol primary particle dispersion (trademark: AS-520, made by Nissan Kagakukogyo K.K.) having an average primary particle size of 10 nm to 100 nm in an amount of 100 parts by solid weight and the same polyvinyl alcohol (PVA-117) as in Comparative Example III-1 in an amount of 10 parts by solid weight, and coated on the laminated paper sheet by using a Mayer bar and dried to form an ink-receiving layer having a dry weight of 15 g/m$^2$.

Comparative Example III-3

An ink jet recording sheet was prepared by the same procedures as in Example III-1, except that an aqueous colloidal silica coating solution having a solid content of 15% by weight was prepared from a colloidal silica primary particle dispersion (trademark: Snowtex 30, made by Nissan Kagakukogyo K.K.-) having an average primary particle size of 15 nm in an amount of 50 parts by solid weight and the polyvinyl alcohol (PVA-117) in an amount of 100 parts by solid weight, and coated on the laminated paper sheet by using a Mayer bar and dried to form an ink-receiving layer having a dry weight of 15 g/m$^2$.

Comparative Example III-4

A practical gloss ink jet recording sheet (trademark: KH-101, made by Canon Corp.) having an ink-fixing layer formed on a substrate sheet and comprising amorphous silica secondary particles having a large secondary particle size of 1 μm or more and a gloss layer formed on the ink-fixing layer and comprising colloidal silica primary particles was subjected to the following tests.

Tests

The tests were carried out in the same manner as in Example Group II, with the following exceptions.

In the test of the ink absorption capacity, the black-colored ink was solid printed in an ink jetting amount of 18 g/m$^2$. The haze volue test was carried out in the same manner as mentioned above, except that an ink-receiving layer was coated on a transparent substrate film (trademark: Lumilar T, thickness: 75 μm) and the haze value was measured by using a reflection color density meter (Model: HR-100, made by Murakami Shikisaigijitsu Kenkyusho). Also, in Example III-9, the ink receiving layer and the additional ink-absorbent layer laminated on each other exhibited a total haze value of 41%.

The test results are shown in Table 3.

an ink receiving layer was indicated by a weight% of water based on the absolute dry weight of the ink receiving layer. For example, when an ink receiving layer consisted of 100 g of an absolute dry solid and 8 g of water, the water content of the ink receiving layer was 8% by weight. Usually, the dry ink receiving layer had a water content of about 8% by weight.

Also, in Example Group IV, the following pigments were employed.

(1) Silica colloidal particles A-4

An aqueous colloidal solution of silica colloidal particles A-4 having a concentration of 8% by weight was prepared by dispersing wet method synthetic amorphous silica particles having an average primary particle size of 14 nm and an average secondary particle size of 2.4 μm and available under a trademark of Mizukasil P-802 from Mizusawa Kagakukogyo K.K. in water and pulverizing by repeating a combination of a sand grinder treatment and an ultrasonic homogenizer treatment until the average secondary size of the pulverized silica particles reached 70 nm.

(2) Silica colloidal particles B-4

An aqueous colloidal solution of silica colloidal particles B-4 having a concentration of 12% by weight was prepared by dispersing wet method synthetic amorphous silica particles having an average primary particle size of 15 nm and an average secondary particle size of 2.2 μm and available under a trademark of Mizukasil C-212 from Mizusawa Kagakukogyo K.K. in water and pulverizing by repeating a combination of a sand grinder treatment and an ultrasonic homogenizer treatment until the average secondary particle size of the pulverized silica particles reached 200 nm.

TABLE 3

| Example No. | | Ink-absorption | | Water resistance | Color density | Gloss of solid printed portion | Haze value (*)$_1$ (%) | Smoothness (*)$_2$ (sec/10 ml) | Content of pigment (wt %) |
|---|---|---|---|---|---|---|---|---|---|
| | | Ink-absorbing rate | Ink-absorption capacity | | | | | | |
| Example | III-1 | 4 | 4 | 4 | 2.32 | 3–4 | 9 | 12000 | 71 |
| | III-2 | 4 | 4 | 4 | 1.99 | 3 | 36 | 4200 | 80 |
| | III-3 | 4 | 4 | 4 | 1.87 | 3 | 51 | 2700 | 67 |
| | III-4 | 4 | 4 | 4 | 1.79 | 3 | 60 | 1800 | 71 |
| | III-5 | 4 | 4 | 4 | 2.14 | 3 | 18 | 9800 | 71 |
| | III-6 | 4 | 4 | 4 | 2.37 | 4 | 10 | 41000 | 71 |
| | III-7 | 3 | 3 | 4 | 2.35 | 3 | 8 | 13000 | 59 |
| | III-8 | 4 | 4 | 4 | 1.70 | 3 | 65 | 1200 | 71 |
| | III-9 | 4 | 4 | 4 | 2.17 | 3 | 8 | 1100 | 76 |
| Comparative Example | III-1 | 4 | 4 | 2 | 1.27 | 1 | 85 | 25 | 77 |
| | III-2 | 2 | 1 | 4 | 2.29 | 3–4 | 8 | 13000 | 91 |
| | III-3 | 1 | 1 | 1 | 2.45 | 2 | 3.5 | — | 67 |
| | III-4 | 4 | 4 | 4 | 1.48 | 2 | — | 520 | — |

Note
(*)$_1$ Haze value was of the ink receiving layer.
(*)$_2$ Bekk smoothness was determined in accordance with JIS P8119.

Table 3 shows that the ink jet recording sheets of Examples III-1 to III-9 in accordance with the present invention exhibited satisfactory ink-absorption properties, the ink receiving layer exhibited high water resistance, and smoothness and the solid printed ink images had a satisfactory gloss, and a high color density.

Example Group IV (Examples IV-1 to IV-15 and Comparative Examples IV-1 to IV-2)

In Example Group IV, the coating amount was indicated by a corresponding dry coating weight. The water content of (3) Aluminosilicate colloidal particles B An aqueous aluminum silicate colloidal dispersion B having a solid content of 10% by dry weight, was prepared by dispersing synthetic aluminosilicate secondary agglomeration (trademark: Kyowaad 700, made by Kyowa Chemical Industries Co., Ltd.) having an average primary particle size of 3 to 40 nm and an average secondary particle size of 10 μm in water, and pulverizing by repeating a combination of a sand grinder treatment and an ultrasonic homogenizer treatment until the average secondary particle size reached 150 nm.

Example IV-1

An aqueous colloidal silica coating solution having a solid content of 8% by weight was produced from the silica colloidal solution A-4 in an amount of 100 parts by solid weight, and a polyvinyl alcohol (trademark: PVA-124, made by Kuraray Co., Ltd.) having a degree of polymerization of 2400 and a degree of saponification of 98.5% in an amount of 50 parts by solid weight, and coated on a surface of a shaping base consisting of a polyethylene terephthalate film (trademark: Lumilar T, made by Toray Industries Inc.) having a thickness of 75 μm and a surface roughness Ra of 0.02 μm to form a coating layer corresponding to an ink-receiving layer and having a dry weight of 15 g/m².

A synthetic paper sheet (trademark: Yupo FPG 80, made by Oji Yuka Goseishi K.K.) having a basis weight of 60 g/m² was superposed on and press-bonded to the coating layer formed on the shaping base at a temperature of 75° C. under a linear pressure of 50 kg/cm by using a calender. Then, the resultant laminate was separated from the shaping base film, to obtain an ink jet recording sheet.

Example IV-2

An aqueous colloidal silica coating solution having a solid content of 8% by weight was produced from the silica colloidal solution B-4 in an amount of 100 parts by solid weight, and a polyvinyl alcohol (trademark: PVA-135H, made by Kuraray Co., Ltd.) having a degree of polymerization of 3500 and a degree of saponification of 99% or more in an amount of 50 parts by solid weight, and coated on a surface of a synthetic paper sheet (trademark: Yupo FPG 80, made by Oji Yuka Goseishi) having a basis weight of 60 g/m², and dried, to form an under coating layer for an additional ink-absorbent layer having a dry weight of 15 g/m².

Separately, an aqueous silica colloidal coating solution having a solid content of 8% by weight was prepared from 100 parts by solid weight of the silica colloidal dispersion A-4 and 50 parts by solid weight of the polyvinyl alcohol (PVA-135H), and coated on a surface of the same shaping base film as in Example IV-1 to form a coating layer corresponding to an ink-receiving layer and having a dry weight of 15 g/m².

The undercoating layer on the synthetic paper sheet was superposed on and press-bonded to the coating layer formed on the shaping base at a temperature of 75° C. under a linear pressure of 50 kg/cm by using a calender. Then, the resultant laminate was separated from the shaping base film, to obtain an ink jet recording sheet.

Example IV-3

An aqueous colloidal silica coating solution having a solid content of 8% by weight was produced from the silica colloidal dispersion A-4 in an amount of 100 parts by solid weight, and the polyvinyl alcohol (PVA-135H) in an amount of 50 parts by solid weight, and coated on a surface of the same shaping base film as in Example IV-1 to form a coating layer corresponding to an outermost ink-receiving layer and having a dry weight of 15 g/m².

The same ink jet recording sheet as in Example IV-1 composed of the synthetic paper sheet and the ink jet receiving layer laminated on the synthetic paper sheet was superposed on and press-bonded to the coating layer formed on the shaping base so that the ink receiving layer on the synthetic paper sheet is brought into contact with the coating layer on the shaping base film at a temperature of 75° C. under a linear pressure of 50 kg/cm by using a calender. Then, the resultant laminate was separated from the shaping base film, to obtain an ink jet recording sheet.

Example IV-4

An aqueous colloidal silica coating solution having a solid content of 8% by weight was produced from the silica colloidal dispersion A-4 in an amount of 100 parts by solid weight, and the polyvinyl, alcohol (PVA-135H) in an amount of 50 parts by solid weight, and coated on a surface of the same synthetic paper sheet (Yupo FPG-80) as in Example IV-2 to form an undercoating coating layer corresponding to an additional ink-absorbent layer and having a dry weight of 15 g/m².

Separately, an aqueous colloidal silica coating solution having a solid content of 8% by weight was prepared from 100 parts by solid weight of the silica colloidal dispersion A-4 and 50 parts by solid weight of the polyvinyl alcohol (PVA-135H), and coated on a surface of the same shaping base film (Lumilar T) as in Example IV-1, to form a coating layer corresponding to an ink-receiving layer and having a dry weight of 15 g/m².

The undercoat layer formed on the synthetic paper sheet was wetted with water in an amount of 3 g/m² by using a Mayer bar.

The water-wetted undercoating layer on the synthetic paper sheet was superposed on and press-bonded to the coating layer on the shaping base film by using a calender at a temperature of 75° C. under a linear pressure of 50 kg/cm. The resultant laminate was separated from the shaping base film to obtain an ink jet recording sheet.

Example IV-5

An ink jet recording sheet was produced by the same procedures as in Example IV-1, except that the shaping base film was replaced by a shaping metal drum having chromium-plated and a mirror-finished peripheral surface with a surface roughness Ra of 0.05 μm.

The synthetic paper sheet (Yupo FPG80) was superposed on and press-bonded to the coating layer formed on the shaping drum under a linear pressure of 50 kg/cm, and the resultant laminate was separated from the shaping drum surface, to provide an ink jet recording sheet.

Example IV-6

An ink jet recording sheet was produced by the same procedures as in Example IV-1, except that the silica colloidal dispersion A-4 was replaced by the silica colloidal dispersion B-4.

Example IV-7

An ink jet recording sheet was produced by the same procedures as in Example IV-1, except that the polyvinyl alcohol (PVA-124) was replaced by another polyvinyl alcohol (trademark: PVA-117, made by Kuraray Co., Ltd.) having a degree of polymerization of 1800.

Example IV-8

An ink jet recording sheet was produced by the same procedures as in Example IV-1, except that the polyvinyl alcohol (PVA-124) was replaced by another polyvinyl alcohol (trademark: PVA-140H, made by Kuraray Co., Ltd.) having a degree of polymerization of 4000.

Example IV-9

An ink jet recording sheet was produced by the same procedures as in Example IV-1, except that the silica colloidal dispersion A-4 was replaced by the aluminosilicate colloidal dispersion B.

Example IV-10

An ink jet recording sheet was produced by the same procedures as in Example IV-1, except that the aqueous aluminosilicate colloidal coating solution was prepared from 100 parts by solid weight of the aluminosilicate colloidal dispersion B and 3 parts by solid weight of a polyethylene-polyamine-dicyandiamide condensation reaction product (trademark: PAP-1, made by Nihon Senkakogyo K.K.).

Example IV-11

An ink jet recording sheet was produced by the same procedures as in Example IV-1, except that the synthetic paper sheet (Yupo FPG 80) was replaced by a laminated paper sheet produced by extrusion-laminating a coated paper sheet (trademark.: OK Coat, made by Oji Paper Co.) having a basis weight of 127.9 $g/m^2$ with a polyethylene resin layer with a thickness of 20 $\mu$m.

Example IV-12

An aqueous silica colloidal coating solution having a solid content of 8% by weight was prepared from the silica colloidal dispersion A-4 in an amount of 100 parts by solid weight and 40 parts by weight of polyvinyl alcohol (available under the trademark of PVA-140H, from Kuraray Co., Ltd.) having a degree of polymerization of 4000 and a degree of saponification of 99% or more.

The aqueous silica colloidal coating solution was coated on a surface of a shaping base consisting of a polyethylene terephthalate film (Lumilar T) having a thickness of 38 $\mu$m and a surface roughness Ra of 0.02 $\mu$m, and dried, to form a coating layer having a dry weight of 15 $g/m^2$.

The same aqueous silica colloidal coating solution as mentioned above was coated on a surface of the laminated paper sheet and dried to form an additional ink-absorbent layer having a dry weight of 15 $g/m^2$. The additional ink-absorbent layer was exposed to water vapor to absorb therein water in an amount of 7.5 $g/m^2$, namely to a water content of 50% by weight.

The water-absorbed additional ink-absorbent layer on the laminated paper sheet was superposed on and press-bonded to the coating layer formed on the shaping base film at a temperature of 50° C. under a linear pressure of 50 kg/cm by using a calender. Then, the resultant laminate was removed from the shaping base film, to provide an ink jet recording sheet.

Example IV-13

An aqueous silica colloidal coating solution having a solid content of 8% by weight was prepared from 100 parts by solid weight of the silica colloidal dispersion A-4 and 50 parts by solid weight of the same polyvinyl alcohol (PVA-124) as in Example IV-1, and coated on a surface of the same synthetic paper sheet (Yupo FPG-80) as in Example IV-1 by using a Mayer bar and dried, to form an ink-receiving layer having a dry weight of 15 $g/m^2$.

Example IV-4

An aqueous silica colloidal coating solution having a solid content of 8% by weight was produced from 100 parts by solid weight of the silica colloidal dispersion A-4 and 50 parts by solid weight of the same polyvinyl alcohol (PVA-124) as in Example IV-1, and coated on a surface of a wood-free paper sheet having a basis weight of 127 $g/m^2$ to form a coating layer having a dry coating weight of 15 $g/m^2$, and incompletely dried to such an extent that the dried coating layer had a water content of about 60% by weight.

A polyethylene terephthalate film (trademark: Lumilar T made by Toray) having a thickness of 75 $\mu$m and a surface roughness of 0.02 $\mu$m was superposed on the incompletely dried coating layer on the paper sheet under pressure, and the laminate was completely dried. The polyethylene terephthalate film was removed from the dried laminate, to provide an ink jet recording sheet.

Example IV-15

An aqueous silica colloidal coating solution having a solid content of 8% by weight was prepared from 100 parts by solid weight of the silica colloidal dispersion A-4 and 50 parts by solid weight of the polyvinyl alcohol (PVA-124) as in Example IV-1, and coated on a surface of a shaping base consisting of the same polyethylene terephthalate film (Lumilar T) in Example IV-1, and dried to form a coating layer corresponding to an ink-receiving layer and having a dry weight of 8 $g/m^2$.

Separately, an aqueous aluminosilicate colloidal coating solution having a solid content of 10% by weight was prepared from 100 parts by solid weight of the aluminosilicate colloidal dispersion B and 50 parts by solid weight of polyvinyl alcohol (PVA-117), and coated on a surface of a wood-free paper sheet having a basis weight of 127 $g/m^2$ by using a Mayer bar, to form a non-dried coating layer corresponding to an additional ink-absorbent layer and having a dry weight of 7 $g/m^2$.

The non-dried coating layer on the paper sheet was superposed on the coating layer on the shaping base film under pressure, and dried (in accordance with a wet-laminating method). Then the shaping base film was separated from the resultant laminate.

An ink jet recording sheet was obtained.

Comparative Example IV-1

An aqueous solution of 10% by solid weight of a polyvinyl alcohol (trademark: PVA-117, made by Kuraray Co., Ltd.) was coated on a surface of the same laminated paper sheet as in Example IV-11, and dried to form an ink-receiving layer having a dry weight of 10 $g/m^2$.

An ink jet recording sheet was obtained.

Comparative Example IV-2

A practical ink jet recording gloss sheet (trademark: GP-101, supplied by Canon Corp.) was subjected to the following tests.

Tests

The ink jet recording sheets of Examples IV-1 to IV-15 and Comparative Examples IV-1 and IV-2 were carried out to the same water resistance, ink absorption, color density and gloss tests as in Example Group I and the following coating layer bonding strength and smoothness tests.

In the measurement of the ink absorption capacity of the ink receiving layer, yellow-, magenta-, and cyan-colored inks were successively solid printed in a total amount of 25 $g/m^2$ on a square area of 10 cm×10 cm of the ink receiving layer.

[Coating layer bonding strength]

An adhesive tape was adhered to the surface of the ink-receiving layer of the ink jet recording sheet, lightly pressed by hand and then removed.

The test results were evaluated in the following four classes.
4: No change appeared in the ink-receiving layer.
3: A very small portion of the ink-receiving layer was removed, and the remaining ink-receiving layer is still usable for practice.
2: The ink-receiving layer was partially removed.
1: Almost all of the ink-receiving layer was removed.
[Coating layer smoothness]
The smoothness of the ink-receiving layer of the ink jet recording sheet was observed by the naked eye and evaluated in the following three classes.
3: The surface of the ink-receiving layer was quite smooth.
2: The ink-receiving layer surface was lightly roughened.
1: The ink-receiving layer surface was certainly roughened, and had a bad appearance.
The test results are shown in Table 4.

by dispersing wet method synthetic amorphous silica particles having an average primary particle size of 16 nm and an average secondary particle size of 9 μm and available under a trademark of Nipsil LP from Nihon Silica Kogyo K.K. in water and pulverizing by repeating a combination of a sand grinder treatment and an ultrasonic homogenizer treatment until the average secondary particle size of the pulverized silica particles reached 50 nm.

Example V-1

An aqueous silica colloidal coating solution having a solid content of 8% by weight was prepared from 100 parts by solid weight of the silica colloidal dispersion A-5 and 40 parts by solid weight of a polyvinyl alcohol (trademark: PVA-124, made by Kuraray Co., Ltd.) having a degree of polymerization of 2400 and a degree of saponification of 98.5%, and coated on a surface of a transparent polyethylene terephthalate (PET) film (trademark: Merinex D535, made by ICI) having a thickness of 100 μm and a haze value of

TABLE 4

| | | Ink-absorption | | | | Gloss of | Coating layer | Coating |
| --- | --- | --- | --- | --- | --- | --- | --- | --- |
| Example No. | | Ink-absorbing rate | Ink-absorption capacity | Water resistance | Color density | printed ink images | bonding strength | layer smoothness |
| Example | IV-1 | 4 | 3 | 4 | 2.15 | 4 | 4 | 3 |
| | IV-2 | 4 | 4 | 4 | 2.13 | 4 | 3 | 3 |
| | IV-3 | 4 | 4 | 4 | 2.15 | 4 | 3 | 3 |
| | IV-4 | 4 | 4 | 4 | 2.16 | 4 | 4 | 3 |
| | IV-5 | 4 | 3 | 4 | 2.15 | 4 | 4 | 3 |
| | IV-6 | 4 | 3 | 4 | 1.75 | 4 | 4 | 3 |
| | IV-7 | 4 | 3 | 3 | 2.18 | 4 | 4 | 3 |
| | IV-8 | 4 | 3 | 4 | 2.17 | 4 | 4 | 3 |
| | IV-9 | 4 | 3 | 4 | 1.82 | 4 | 4 | 3 |
| | IV-10 | 4 | 3 | 4 | 1.84 | 4 | 4 | 3 |
| | IV-11 | 4 | 3 | 4 | 2.13 | 4 | 4 | 3 |
| | IV-12 | 4 | 4 | 4 | 2.14 | 3 | 3 | 3 |
| | IV-13 | 4 | 3 | 4 | 2.12 | 3 | 2 | 2 |
| | IV-14 | 4 | 3 | 4 | 2.16 | 3 | 2 | 2 |
| | IV-15 | 4 | 3 | 3 | 2.11 | 3 | 2 | 2 |
| Comparative | IV-1 | 1 | 1 | 1 | 2.31 | 1 | 2 | 2 |
| Example | IV-2 | 4 | 4 | 4 | 1.42 | 1 | 1 | 2 |

Table 4 clearly shows that the ink jet recording sheets of Examples IV-1 to IV-15 in accordance with the present invention were satisfactory in all of the tested results.

Example Group V (Examples V-1 to V-5 and Comparative Examples V-1 and V-3)

In Example Group V, the following pigments were employed.

(1) Silica colloidal particles A-5

An aqueous colloidal solution of silica colloidal particles A-5 having a concentration of 8% by weight was prepared by dispersing wet method synthetic amorphous silica particles having an average primary particle size of 11 nm and an average secondary particle size of 3 μm and available under a trademark of Nipsil HD-2 from Nihon Silica Kogyo K.K. in water, and pulverizing by repeating a combination of a sand grinder treatment and an ultrasonic homogenizer treatment until the average secondary particle size of the pulverized silica particles reached 30 nm.

(2) Silica colloidal particles B-5

An aqueous colloidal solution of silica colloidal particles B-5 having a concentration of 8% by weight was prepared 0.5% by using a Mayer bar and dried to form an ink-receiving layer having a dry weight of 20 g/m². An ink jet recording sheet was obtained.

Example V-2

An aqueous silica colloidal coating solution having a solid content of 12% by weight was prepared from 100 parts by solid weight of the silica colloidal dispersion B-5 and 40 parts by solid weight of a polyvinyl alcohol (trademark: PVA-124, made by Kuraray Co., Ltd.) having a degree of polymerization of 2400 and a degree of saponification of 98.5%, and coated on a surface of a transparent polyethylene terephthalate (PET) film (trademark: Merinex D535, made by ICI) having a thickness of 100 μm and a haze value of 0.5% by using a Mayer bar and dried to form an ink-receiving layer having a dry weight of 20 g/m². An ink jet recording sheet was obtained.

Example V-3

An aqueous silica colloidal coating solution having a solid content of 10% by weight was prepared from 100 parts by solid weight of the silica colloidal dispersion A-5 and 40 parts by solid weight of a polyvinyl alcohol (trademark: PVA-117, made by Kuraray Co., Ltd.) having a degree of polymerization of 1800 and a degree of saponification of 98.5%, and coated on a surface of a transparent polyethylene terephthalate (PET) film (trademark: Merinex D535, made by ICI) having a thickness of 100 μm and a haze value of 0.5% by using a Mayer bar and dried to form an ink-receiving layer having a dry weight of 20 g/m². An ink jet recording sheet was obtained.

Example V-4

An aqueous silica colloidal coating solution having a solid content of 8% by weight was prepared from 100 parts by solid weight of the silica colloidal dispersion A-5 and 40 parts by solid weight of a polyvinyl alcohol (trademark: PVA-235, made by Kuraray Co., Ltd.) having a degree of polymerization of 3500 and a degree of saponification of 88.0%, and coated on a surface of a transparent polyethylene terephthalate (PET) film (trademark: Merinex D535, made by ICI) having a thickness of 100 μm and a haze value of 0.5% by using a Mayer bar and dried to form an ink-receiving layer having a dry weight of 20 g/m². An ink jet recording sheet was obtained.

Comparative Example V-1

An aqueous silica coating solution having a solid content of 15% by weight was prepared from 100 parts by solid weight of a wet method synthetic amorphous silica (trademark: Nipsil HD-2, made by Nihon Silicakogyo K.K.) having an average primary particle size of 11 nm and an average secondary particle size of 3 μm and 40 parts by solid weight of a polyvinyl alcohol (trademark: PVA-124, made by Kuraray Co., Ltd.) having a degree of polymerization of 2400 and a degree of saponification of 98.5%, and coated on a surface of a transparent polyethylene terephthalate (PET) film (trademark: Merinex D535, made by ICI) having a thickness of 100 μm and a haze value of 0.5% by using a Mayer bar and dried to form an ink-receiving layer having a dry weight of 20 g/m². An ink jet recording sheet was obtained.

Comparative Example V-2

An aqueous solution of 10% by solid weight of a polyvinyl alcohol (trademark: PVA-117, made by Kuraray Co., Ltd.) having a degree of polymerization of 1800 and a degree of saponification of 98.5% was coated on a surface of a transparent polyethylene terephthalate (PET) film (trademark: Merinex D535, made by ICI) having a thickness of 100 μm and a haze value of 0.5% and dried to form an ink-receiving layer having a dry weight of 20 g/m². An ink jet recording sheet was obtained.

Comparative Example V-3

An aqueous silica colloidal coating solution having a solid content of 20% by weight was prepared from 100 parts by solid weight of the silica colloidal dispersion A-5 and 80 parts by solid weight of a styrene-butadiene copolymer latex (trademark: D693, made by Nihon Goseigomu K.K.), and coated on a surface of a transparent polyethylene terephthalate (PET) film (trademark: Merinex D535, made by ICI) having a thickness of 100 μm and a haze value of 0.5% by using a Mayer bar and dried to form an ink-receiving layer having a dry weight of 20 g/m². An ink jet recording sheet was obtained.

Tests

The ink jet recording sheets of Examples V-1 to V-4 and Comparative Examples V-1 and V-3 were subjected to the following tests.

The ink jet printing procedure was carried out by using a practical ink jet printer (trademark: BJC-600J, made by Canon Corp.).

[Haze value (transparency)]

The haze value was determined in accordance with JISK 7105 by using a haze value meter (model: HR-100) made by Murakami Shikisaigijitsu Kenkyusho.

[Water resistance]

A water drop was put on a surface of the ink-receiving layer of the specimen, 30 minutes after the water drop-putting, the water drop was wiped off, and the water-wetted portion of the ink-receiving water was rubbed by a finger and the results were observed by the naked eye and evaluated in the following three classes.

3: No change in the ink-receiving layer was found.

2: The ink-receiving layer was partially removed.

1: The ink receiving layer was completely removed.

[Ink absorbing rate (ink drying rate)]

Each of black, yellow, magenta and cyan-colored inks was solid printed on the ink-receiving layer of the specimen, immediately every 5 seconds after the printing, a wood-free paper sheet was superposed on the ink-printed portion of the specimen and the transfer of the ink to the paper sheet was observed. The time necessary to completely fix the printed ink in the ink receiving layer and to cause the printed ink not to be transferred to the paper sheet, was determined. The test results were evaluated in the following four classes.

4: The ink-fixing time was less than 5 seconds.

3: The ink-fixing time was 5 seconds or more but less than 10 seconds.

2: The ink-fixing time was 10 seconds or more but less than 50 seconds.

1: The ink-fixing time was 50 seconds or more.

[Color density]

A solid printed specimen was placed on a coated paper sheet and the color density of the solid ink images on the specimen was measured by Macbeth reflection color density tester (model: RD-920). The color density of the ink images was indicated by an average value of five measurement results.

[OHP Projection]

Ink images formed on the specimen was projected onto an OHP, and the sharpness of the projected images was observed by the naked eye and evaluated in the following four classes.

4: The background was light and the projected images were very clear.

3: The background was slightly dark and the projected images were clear and practically satisfactory.

2: The background was certainly dark and the clarity of the projected images was unsatisfactory.

1: The background was quite dark and the projected images were unclear.

TABLE 5

| Example No. | | Haze value (%) | Water resistance | Ink absorbing rate | Color density | OHP projection |
|---|---|---|---|---|---|---|
| Example | V-1 | 8 | 3 | 4 | 2.2 | 4 |
| | V-2 | 16 | 3 | 4 | 2.1 | 3 |
| | V-3 | 8 | 2 | 4 | 2.2 | 4 |
| | V-4 | 8 | 2 | 4 | 2.2 | 4 |
| Comparative | V-1 | 85 | 2 | 4 | 1.3 | 1 |

TABLE 5-continued

| Example No. | | Haze value (%) | Water resistance | Ink absorbing rate | Color density | OHP projection |
|---|---|---|---|---|---|---|
| Example | V-2 | 1 | 1 | 1 | 2.3 | 4 |
| | V-3 | 12 | 3 | 1 | 1.8 | 3 |

Table 5 shows that the ink jet recording sheets of Examples V-1 to V-4 in accordance with the present invention had a high transparency, a satisfactory water resistance, a satisfactory ink-absorption property, and a high color density of ink images and was usable for over head projection (OHP).

We claim:

1. An ink jet recording material comprising:
    a substrate; and
    an ink-receiving layer formed on at least one surface of the substrate, wherein the ink-receiving layer comprises a binder, and a plurality of secondary particles, wherein the secondary particles have an average secondary particle size of 10 to 300 nm, each of the secondary particles consisting essentially of a plurality of primary particles of at least one member selected from the group consisting of silica prepared by wet method, which silica will be referred to as wet method silica hereinafter, and aluminosilicate, and wherein the primary particles are agglomerated with each other to form the secondary particles by an attraction force including hydrogen bonding force between silanol groups located on the surfaces of the primary particles and van der Waals force between the primary particles, in each of the secondary particles, pores being formed between the agglomerated primary particles,
    the ink receiving layer having a haze value of 4 to 65%; and
    at least one additional ink-absorbent layer comprising a binder resin and a plurality of pigment particles being formed between the substrate and the ink-receiving layer.

2. The ink jet recording material as claimed in claim 1, wherein the binder for the ink-receiving layer comprises water-soluble resin.

3. The ink jet recording material as claimed in claim 1, wherein the secondary particles each consist essentially of a plurality of silica primary particles are those prepared from agglomerated silica particles by a breaking down method by which the average secondary particle size is adjusted to 10 to 300 nm.

4. The ink jet recording material as claimed in claim 1, wherein the primary particles of wet method II silica and aluminosilicate have an average primary particle size of 3 to 40 nm.

5. The ink jet recording material as claimed in claim 1, wherein the ink-receiving layer has a plurality of pores formed therein and exhibits a pore radius distribution curve having a peak corresponding to a pore radius of about 40 nm or less.

6. The ink jet recording material as claimed in claim 5, wherein at least one additional ink-absorbent layer comprising a binder resin and a plurality of pigment particles, is formed between the substrate and the ink-receiving layer.

7. The ink jet recording material as claimed in claim 5, wherein the binder for the additional ink-absorbent layer comprises a water-soluble resin.

8. The ink jet recording material as claimed in claim 2 or 7, wherein the water-soluble resin comprises a polyvinyl alcohol having an degree of polymerization of 2,000 or more.

9. The ink jet recording material as claimed in claim 2 or 7, wherein the water-soluble resin comprises a polyvinyl alcohol having a degree of saponification of 95% or more.

10. The ink jet recording material as claimed in claim 5, wherein the secondary particles are each composed essentially of a plurality of primary particles having an average primary particle size of 3 to 40 nm and agglomerated with each other, and have an average secondary particle size of 10 to 150 nm.

11. The ink jet recording material as claimed in claim 5, wherein the ink-receiving layer has a plurality of pores formed therein, and exhibits an integrated pore volume of all the pores of 0.6 ml/g or more, and a total volume of the pores with a pore radius of 3 to 20 nm of 0.3 ml/g or more.

12. The ink jet recording material as claimed in claim 1, wherein at least one additional ink-absorbent layer, comprising a binder resin and a plurality of pigment particles, is formed between the substrate and the ink-receiving layer.

13. The ink receiving layer as claimed in claim 1, wherein the binder for the ink-receiving layer comprises a water-soluble resin.

14. The ink jet recording material as claimed in claim 1, wherein the secondary particles are each composed essentially of a plurality of primary particles having an average primary particle size of 3 to 40 nm and agglomerated with each other, and have an average secondary particle size of 10 to 200 nm.

15. The ink jet recording material as claimed in claim 1, wherein the substrate is transparent.

16. The ink jet recording material as claimed in claim 15, wherein the ink-receiving layer formed on the transparent substrate surface comprises the secondary particles having an average secondary particle size of 10 to 100 nm and formed from the primary particles of at least one member selected from the group consisting of wet method silica and aluminosilicate, having an average primary particle size of 3 to 30 nm.

17. The ink jet recording material as claimed in claim 15 or 16, having a haze value of 20% or less.

18. The ink jet recording material as claimed in claim 1, wherein the substrate is bonded to the ink-receiving layer through an intermediate layer comprising a member selected from the group consisting of bonding materials and adhesive materials.

19. The ink jet recording material as claimed in claim 1, wherein the primary particles for the secondary particles for the ink-receiving layer are those of the wet method silica.

20. The ink jet recording material as claimed in claim 1, wherein the primary particles are agglomerated with each other to form the secondary particles without any binder.

* * * * *